United States Patent [19]

Steidel

[11] Patent Number: 4,839,814

[45] Date of Patent: Jun. 13, 1989

[54] SIZE INDEPENDENT MODULAR WEB PROCESSING LINE AND MODULES

[75] Inventor: Leonard R. Steidel, Grand Island, N.Y.

[73] Assignee: Moore Business Forms, Inc., Grand Island, N.Y.

[21] Appl. No.: 802,346

[22] Filed: Nov. 27, 1985

Related U.S. Application Data

[63] Continuation-in-part of Ser. No. 695,963, Jan. 29, 1985, Pat. No. 4,648,540, which is a continuation-in-part of Ser. No. 675,149, Nov. 27, 1984, abandoned.

[51] Int. Cl.[4] ........................ G06F 15/46; B65H 20/24

[52] U.S. Cl. ........................................ 364/469; 226/29; 226/111

[58] Field of Search ........ 364/468, 469, 478, 131–133, 364/138, 174; 226/24, 28–30, 40, 108, 111; 318/560, 561, 625

[56] References Cited

U.S. PATENT DOCUMENTS

| | | | |
|---|---|---|---|
| 1,620,863 | 3/1927 | Belcher . | |
| 1,653,199 | 12/1927 | Belcher . | |
| 2,039,236 | 1/1935 | Meisel | 101/128 |
| 3,049,078 | 8/1962 | Smith, Jr. | 101/228 |
| 3,483,772 | 12/1969 | D'Amato | 74/821 |
| 3,548,747 | 12/1970 | D'Amato | 101/153 |
| 3,677,177 | 7/1972 | Smith, Jr. | 101/228 |
| 3,735,700 | 5/1973 | Roser | 101/228 |
| 4,304,001 | 12/1981 | Cope et al. | 364/132 |
| 4,346,446 | 8/1982 | Erbskin et al. | 364/469 |
| 4,372,206 | 2/1983 | Tison et al. | 101/228 |
| 4,423,365 | 12/1983 | Turner | 318/561 |
| 4,472,783 | 9/1984 | Johnstone et al. | 364/468 |
| 4,495,584 | 1/1985 | Yoshida | 364/478 |
| 4,506,321 | 3/1985 | Comstock et al. | 318/561 |
| 4,527,468 | 7/1985 | Piotroski | 364/478 |
| 4,533,269 | 8/1985 | Pou et al. | 226/28 |
| 4,565,950 | 1/1986 | Kikuno | 318/625 |
| 4,604,704 | 8/1986 | Eaves et al. | 364/468 |
| 4,646,245 | 2/1987 | Prodel et al. | 364/468 |

FOREIGN PATENT DOCUMENTS

| | | |
|---|---|---|
| 0084939A1 | 8/1983 | European Pat. Off. . |
| 2827942 | 6/1978 | Fed. Rep. of Germany . |
| 3311847 | 3/1983 | Fed. Rep. of Germany . |

*Primary Examiner*—Joseph Ruggiero

*Attorney, Agent, or Firm*—Cushman, Darby & Cushman

[57] ABSTRACT

Modular web processing units may be physically and electrically assembled into clusters to perform various web processes (e.g. the production of paper forms such as invoices, checks, labels, etc.). Each module has a main process driver which is not directly coupled to a web drive mechanism. Rather, the web drive is program controlled so as to effect the desired web process at controlled displacement intervals along the web. Accordingly, a plurality of successive but different form lengths or depths can be accommodated as the web surface is sequentially processed. A system of such modules can be physically wheeled into position as individual units and electrically connected together by suitable umbilical cords to rapidly configure a desired overall web finishing process. Nevertheless, the entire ensemble of modules performs as though it is a unitary special purpose web processing machine with its various process stations interconnected and synchronized by an electronic "drive shaft". One of the modular units automatically becomes the master source of process drive pulses for the others and the entire ensemble may be controlled from the control panel of any one of the modules.

47 Claims, 21 Drawing Sheets

DISPLACEMENT PROFILE (SHORT FORM)

DISPLACEMENT PROFILE (LONG FORM)

MAIN SERVO BOARD (128)

FIG. 15 INTERMODULE STOP CIRCUITRY
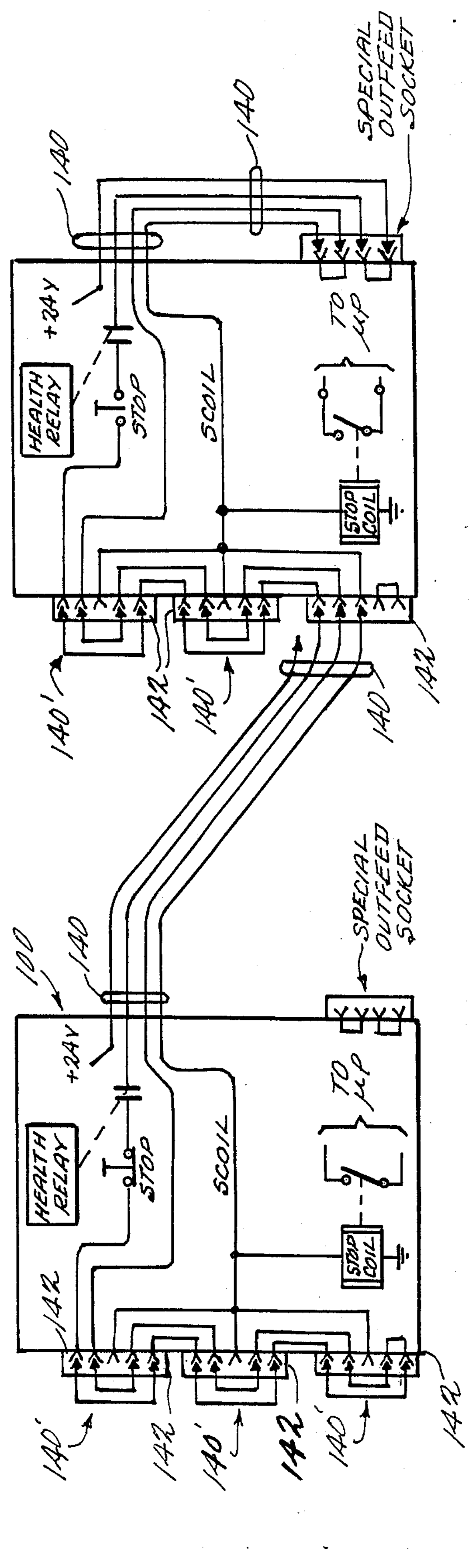
FIG. 14 WATCHDOG DOCTOR BOARD-1110
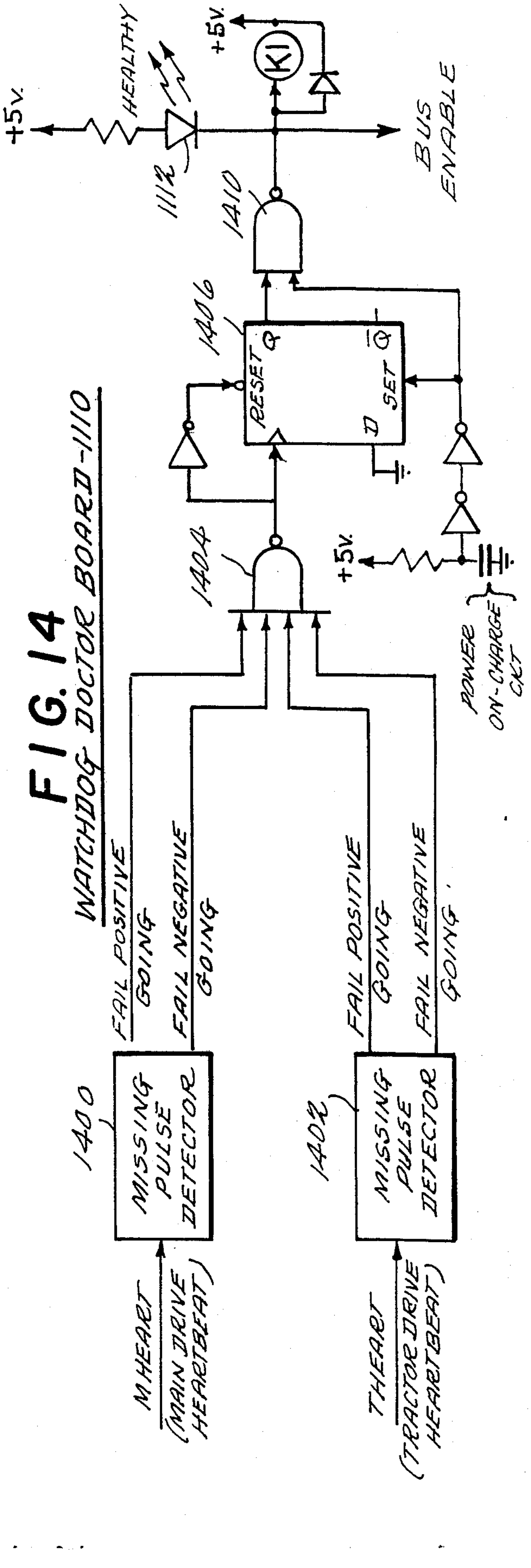

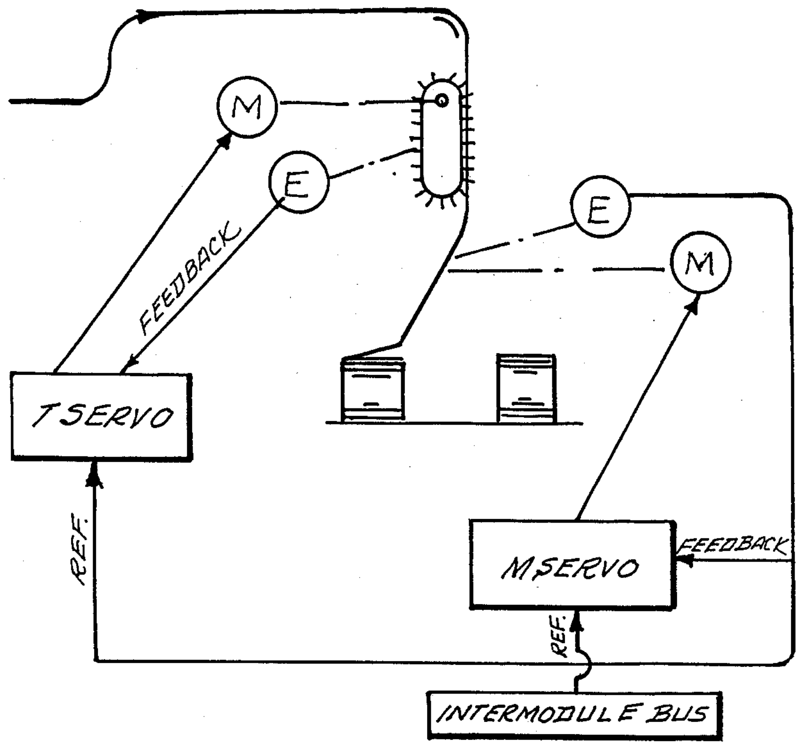
FIG. 16
(FOLDER)
FIG. 17
(INFEED)
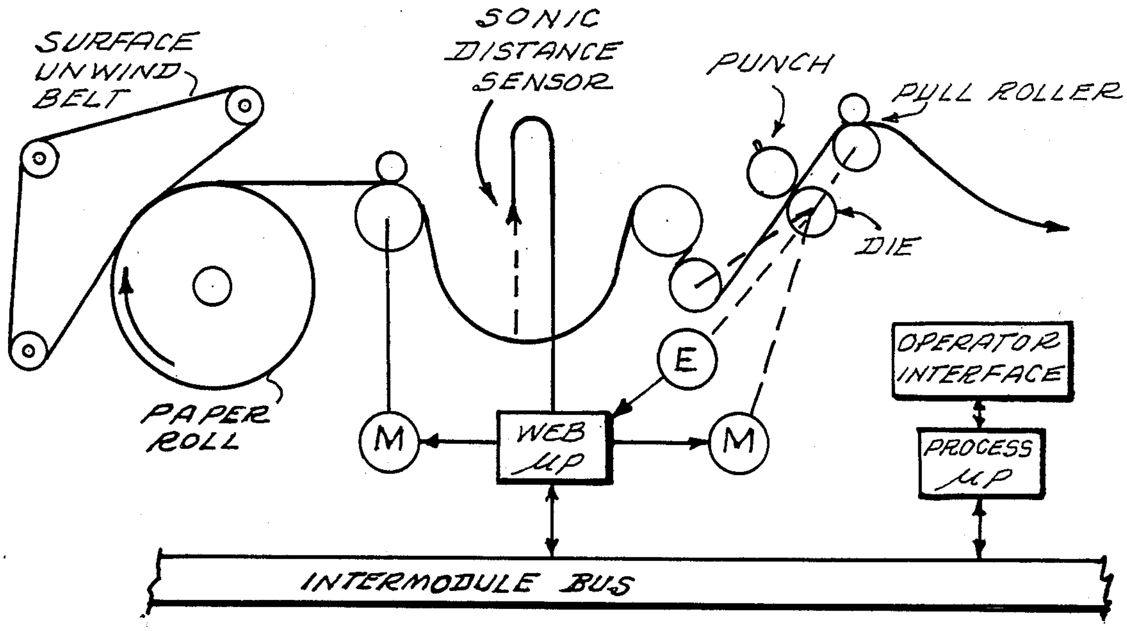

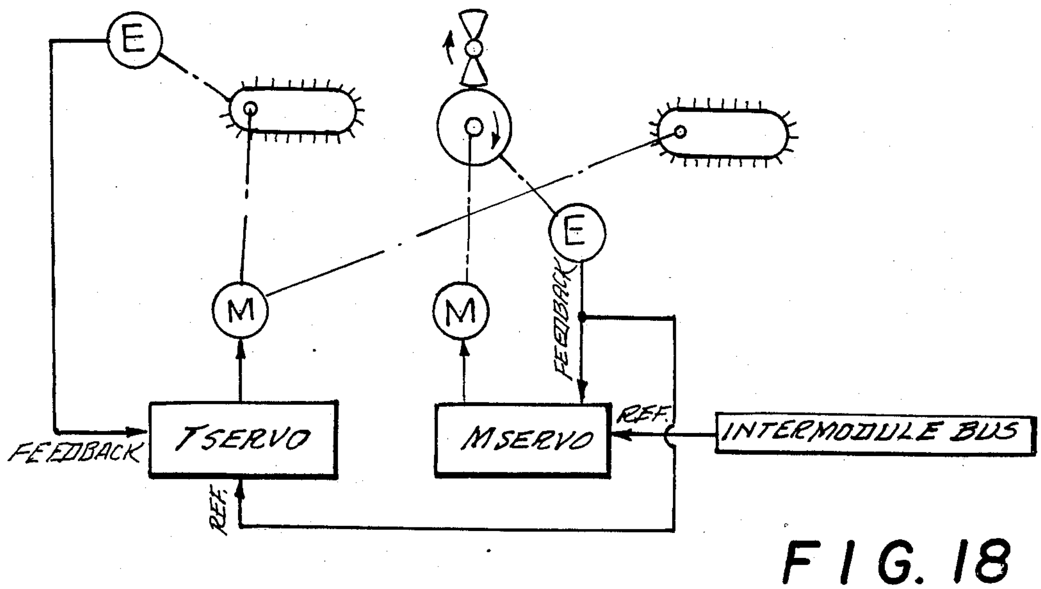
FIG. 18
(NUMBERING, DIECUT, IMPRINT)
FIG. 19A
(CUTOFF)
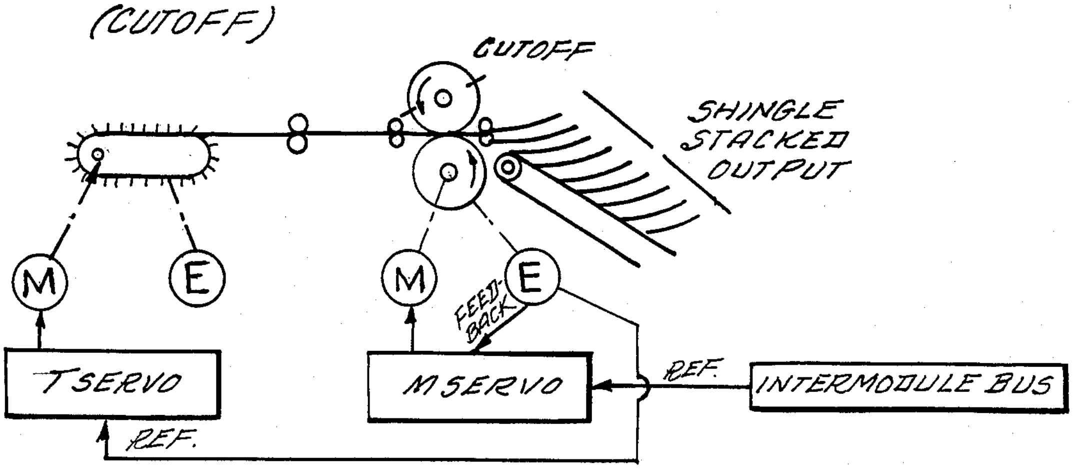
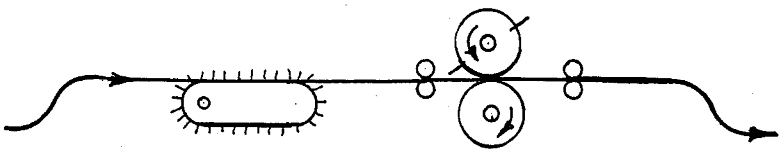
FIG. 19B
(PERFORATION)

TRACTOR SERVO (MAIN DRIVE FEEDBACK ENCODER INTERRUPT ROUTINE FOR TRACTOR SERVO)

MAIN SERVO

FIG. 26
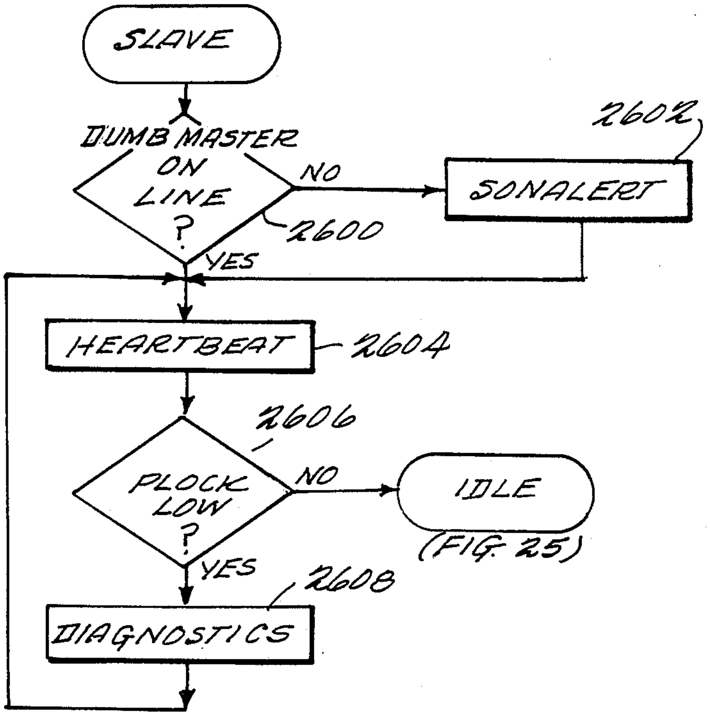
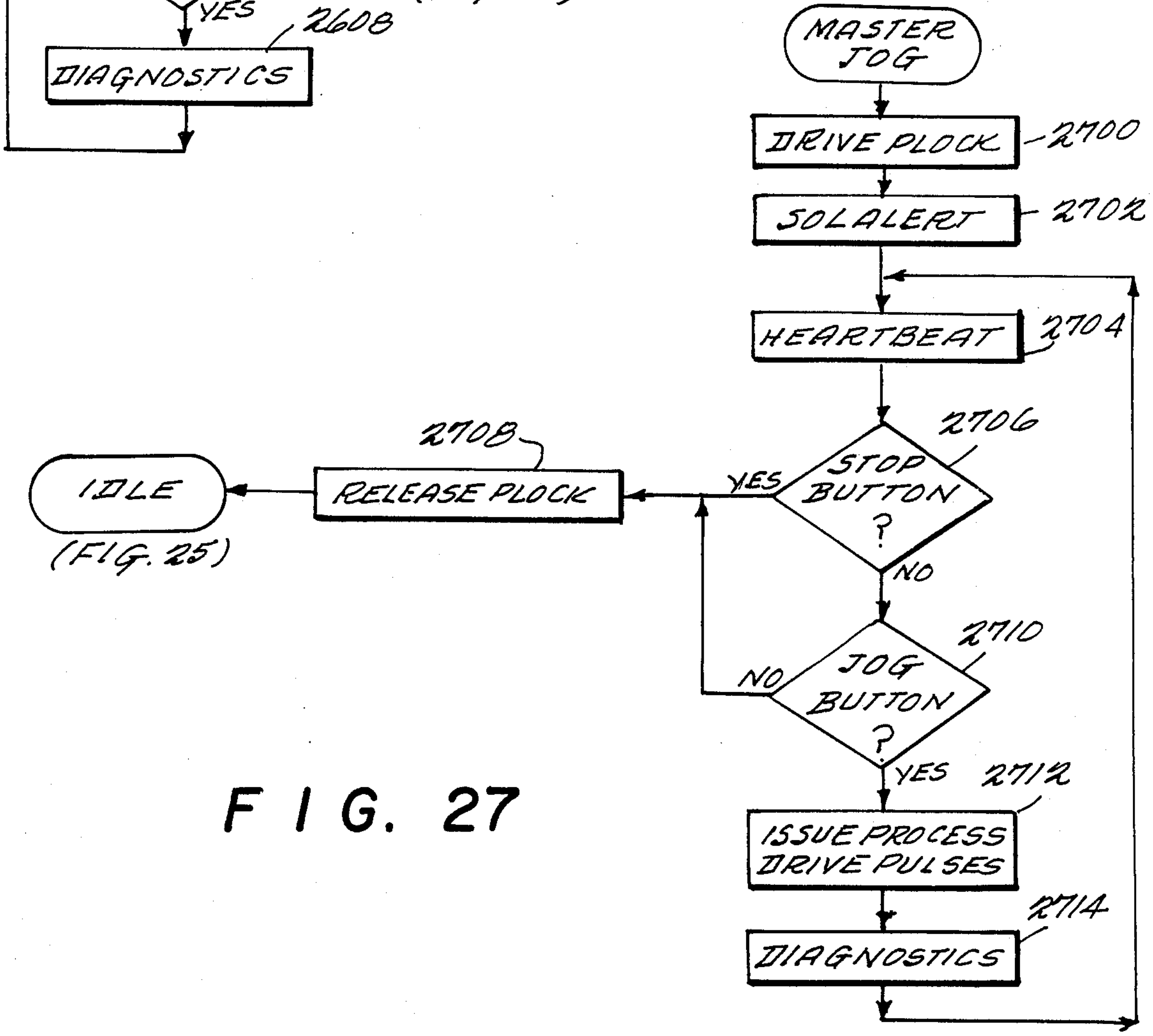
FIG. 27

MAIN DRIVE FEEDBACK ENCODER INTERRUPT ROUTINE FOR MAIN SERVO

SIZE INDEPENDENT MODULAR WEB PROCESSING LINE AND MODULES

This invention relates to web processing apparatus and method. More particularly, it relates to a system of modular web processing units which may be easily reconfigured to perform different overall web finishing functions of diverse types.

This application is a continuation in part of my earlier co-pending, commonly assigned U.S. application Ser. No. 695,963 filed Jan. 29, 1985 (now U.S. Pat. No. 4,648,540) which is, in turn, a continuation in part of my still earlier co-pending commonly assigned U.S. application Ser. No. 675,149 filed Nov. 27, 1984 abandoned. The contents of both these earlier applications are hereby incorporated by reference.

Elongated webs of paper product are often used to produce finished paper business forms of various types. For example, checks, ledger sheets, statements of accounts, invoices, etc. often start out as large rolls of blank paper web. The web is then processed in many different ways to produce a finished form which may include partial perforations so as to permit easy separation of one form from the next or of one part of the form from other parts thereof. Numbering, imprinting, printing with bar codes, MICR printing, punching, gluing, placing, etc. processes are typically sequentially performed on the web to produce a finished roll or "pad" of web product. If the forms are designed for later utilization in automated printing equipment, they typically include so-called tractor drive sprocket holes along the outside edges of the web (with associated partial perforations so as to permit such sprocket drive portion later to be detached). The forms may include multiple layers such as to result in carbon copies, chemically sensitized copies, or the like.

Heretofore, there have been some limited stand-alone web processors (e.g. a reciprocating numbering tool having "stop and go" paper advancement so as to achieve some depth control). An early "stand alone" bar code numbering unit module including some features already described in my aforementioned parent applications (e.g. the web drive followed a programmed velocity profile albeit the process drive was free-running) has been producing commercial product since about July 1984 in one of the assignee's forms processing facilities.

However, for the most part, the complete web finishing process has heretofor been characterized by relatively inflexible processing system design. For example, in some systems, a very complex "line" of processing stations is especially designed and built into a unitary finishing machine with mechanically coupled process and web tractor drives along the length of the entire machine. Even where "stand-alone" individual web processors have been employed, the tractor and process drive have typically also been mechanically linked such that only one fixed pattern of web processing operations can be performed without shutting down the machine and physically changing gears, cylinders, rings, etc. so as to set up the machine for a different mode of operation.

Typically, such web processing operations use web process units having cylinders, rings or the like on which tools or work elements such as numbering modules, imprinters, punches or knives or the like are rotated so as to periodically contact with and operate on the webs. Such tools typically are of relatively high mass and therefore preferably are rotated at constant velocities. Since a rotational tool is involved, they typically also are "balanced" with respect to the rotational axis. Since the paper web is then typically also passed through the process at a constant velocity, it follows that only one fixed pattern of web processing operations may be performed unless the machine is physically reconfigured.

Non-limiting examples of some such typical prior art web processing techniques may be found in the following documents:

U.S. Pat. No. 2,549,605-Huck (1951)
U.S. Pat. No. 3,468,201-Adamson et al (1969)
U.S. Pat. No. 3,539,085-Anderson et al (1970)
U.S. Pat. No. 3,561,654-Greiner (1971)
U.S. Pat. No. 4,406,389-Mowry, Jr. et al (1983)
U.S. Pat. No. 4,473,009-Morgan (1984)
U.S. Pat. No. 4,484,522-Simeth (1984)
U.S. Pat. No. 4,528,630-Sargent (1985)

Almost all such prior systems include some "registration" adjustment feature for making fine changes in the relative location of tool or printing press contact with a moving web. Some even use microprocessor-based controls for controlling registration. Sargent, for example, senses web movement and uses a microprocessor-based system for responsively controlling printing process motions. Morgan uses an infinitely variable mechanical transmission coupled between the web and the process drivers with the transmission ratio being controlled by a microprocessor-based controller to maintain proper printing registration. However, such "fine-tuning" of the web/process registration is still based on an underlying assumption that, at any given time for any given machine set-up, only one form depth is to be processed. Mowry does provide an arrangement for handling variable length documents —but still appears to handle only one document length at any given set up condition.

That is, such prior devices generally have been designed merely to repetitively perform only the same process at the same relative registered location(s) on each successively encountered single form depth dimension of the moving web. Thus they are not truly operator-programmable.

In contrast, the present system is programmable so as to conveniently vary the relationship between process and web drives in accordance with an easily gauged functional relationship. For example, the programmable functions may be chosen to match the average web throughput of other modules (connected thereto only by slack loops and electrical connectors) and/or to effect successive different progressed form depths between successive process operations.

It has been discovered that a considerable improvement (e.g. greatly increased flexibility in the finishing process, reduced set up time and decreased capital investment) can be realized by arranging an ensemble of modular units to effect a desired overall web finishing process—and where the web drive within each module is related to its main process drive by a programmable electronic velocity or displacement "profile" and where all of the process drives operate in synchronism in response to a common electronic "drive shaft".

Some embodiments of an individual stand-alone module are described and claimed in my earlier co-pending parent applications. However, full advantage of the invention is best realized by an ensemble of interconnected modules so as to form an entire web finishing "line". For example, the modules can be grouped together in clusters so as to form an independent "piece" of production gear or to "speed follow" existing production equipment (arranged to supply, take-up or perform some intermediate process in conjunction with the assembled cluster of modules) and provide additional web processing capabilities.

Accordingly, a production facility using such clusters of interconnected modules may be custom configured into a great number of different form finishing/production systems by selecting and arranging modules to meet different product requirements. Each module is preferably mounted on casters for easy portability and movement into and out of any desired manufacturing production "line". The modules can also be clustered in parallel arrangements (e.g. where two different webs being processed in parallel sub-clusters are subsequently merged or collated into a common multilayered web for further common processing in one or more series arranged further sub-cluster of modules).

Microprocessor-based electrical controls provide a mechanically "decoupled" form of programmed motion control for the web drive with respect to the main process drive within each module. An electrical plug connected bus forms an umbilical cord to electrically interconnect the modules being utilized within a common "line". The bus connection permits each module's main process drive to be slaved to a common drive pulse source thus making it appear that all of the process drives are driven from a common drive shaft. At the same time, the bus connections and microprocessor systems are configured so as to permit the entire interconnected system to be operator controlled from the console of any one module and this feature provides great operator flexibility as well as safety features (e.g. since the process can be stopped, started, etc. from any one of the control panels).

The process being performed in any one module can be programmed to have successive different form depths (e.g. form lengths). In the exemplary embodiment, four different successive form depths are permitted and are initially programmed into the modules by an operator during a brief preparatory set-up time. Although an individual module may be programmed to have a set of such programmed form depths which is different from other modules in a cluster, the overall sum of all the programmed form depths in a given module must, of course, define the overall "repeat" period for a given module and therefore should be equal for all modules (assuming, for example, that the process in each module is based upon the same circumference cylinder or the like). At the same time, use of a "double/normal/half" speed control can cause a given module to effect multiple impressions for each single impression effected in another module and vice versa.

Each module includes a pulse function generator for generating reference pulses which typically each represent a predetermined increment of process drive displacement (e.g., in the exemplary embodiment, one bus drive pulse is generated for each 1/12th inch of process displacement at the circumference of a 17 inch diameter cylinder). In a stand-alone mode, the function generator output is used to provide reference pulses to the main process drive of that same module. In a cluster mode, a programmed bus arbitration scheme is employed so as to automatically select the module from which the operator happens to initiate operation of the entire cluster as a "master" source of reference pulses transmitted along the umbilical cord bus to synchronously control the main process drive in each module of the interconnected cluster. As previously mentioned, the system is arranged so as to provide the illusion of duplicate control panels since overall line controls (e.g. stopping, running and half, normal or double speed or the like) can be controlled from the control panel of any one module.

A special stop interlock system is also employed so as to ensure proper interconnection of the umbilical bus lines. In the exemplary embodiment, if any one of the umbilical bus line input sockets (there are three at the input end of each module so as to permit plural modules to feed web into a downstream module) is not filled with an appropriate umbilical bus line plug from an upstream module (there is a single "output" umbilical bus line with attached plug on the output side of each module), then the entire line is incapable of being started or of continuing to run. (Spare "dummy" umbilical cords and plugs are provided at the input side to fill any otherwise unfilled socket.)

In addition, the umbilical cord bus connections are arranged in the exemplary embodiment so as to permit arbitrary bus connection points from one module to the next—provided that one maintains proper in/out directionality for the bus line (i.e. the output umbilical cord and plug from one module always must be plugged into the input socket of a module—unless it is the last downstream module, in which case it is plugged into a special socket on the output side of the module so as to provide power for the stop interlock circuit).

Although the exemplary embodiment is described using conventional sprocket tractor drives for the web, it will be appreciated that any conventional web driving mechanism may be employed including tractorless paper transports.

Web displacement is controlled to a relatively greater precision (e.g. 1/480 inch increments) such that the web drive may be controllably advanced or retarded at approximately 0.002 inch increments thereby achieving accurate desired placement of a process function on the web. Furthermore, since the process tool or the like typically comes periodically into contact with the web (e.g. to effect the desired process), it is typically necessary to "match" the velocity of the web with the velocity of the rotating tool or the like at the time the tool is expected to actually contact the web. At other times, the web velocity is controlled and may be different from the tool velocity so as to achieve different spacing or intervals between tool operations upon the web.

In the exemplary embodiment, pre-stored or programmed data comprising velocity or displacement profiles for the web drive are utilized to properly control web drive with respect to the process drive. In the exemplary embodiment, each time a reference main or process drive pulse occurs (representing another 1/12th inch displacement of process drive), a microprocessor interrupt routine is entered to compute the next required number of web drive pulses (each representing 1/480 inch web displacement) from stored velocity/displacement profile table data. For example, if the velocities are to be "matched", then 40 web drive pulses normally would be required for each process drive pulse—with different numbers of web drive pulses being generated if it is desired to slow down or speed up the web in accordance with the stored profile data. In addition, both the main process drive and the web drive are included in a velocity controlled digital/analog servo loop such that the motor drive is adjusted as necessary to compensate for any detected error between desired and actual sensed velocity/position of the web/process.

The main process employed in any given module may be of virtually any desired type. Some typical conventional processes which may be utilized are as follows:

1. A rotating or reciprocating numbering head;
2. A forms folding module (in this case a "flat" web drive velocity profile would be utilized);
3. A cut off/cross-perforation module;
4. A high resolution dot matrix printer or the like (which may also require constant web velocity if the web is always in contact with the printer process);
5. An unwind/punch module;
6. A rewind module (for rewinding earlier processed forms into an output roll);
7. A collation/fastening module;
9. A diecut module (e.g. for cutting address windows into envelope forms or the like);
10. A lithographic print module;
11. A gluing module for "printing" glue onto forms; or
12. A "placing" module (e.g. for placing credit cards on form or glassine over window diecuts or the like).

Those skilled in the art will no doubt appreciate the fact that there are probably many other kinds of web processes that could be performed in any given module. Nevertheless, as will be explained in more detail below, a cluster of interconnected modules, all performing coordinated processes, will be controlled to have the same average throughput of web material. Transient variations in web length being processed at a given time in different modules is easily accommodated by simply permitting a sufficiently loose loop of web material to exist between each successive module in the line.

In the exemplary embodiment, each module utilizes two microprocessor-servo control systems. The main drive servo system controls the main process drive motor which is typically mechanically coupled directly to drive the web processing function of that particular module. The tractor (or other web drive mechanism) servo system controls the web driving motion so as to meter the correct amount of web travel with respect to process motion. Working together, the microprocessor servo systems are arranged so as to accomplish the following functions:

1. All module processes are maintained at a coordinated speed;
2. Paper infeed to each process is maintained so as to ensure correct process and web velocity as well as correct registration of the process effect on the web;
3. Form dimensions (both width and depth) may be altered simultaneously on an entire cluster of interconnected modules from the control panel of any individual module in the cluster; and
4. Common press commands such as "stop", "jog", "run slow", and "run fast" may be accomplished by an operator from the control panel of any individual module thus making the entire cluster of modules appear to be mechanically coupled together by a common drive shaft.

Microprocessor-based motion control systems in each module accept input parameter data and compare them with tables of web operating velocity/displacement profile data stored in memory. Signals to a tractor drive motor thus follow an operating velocity/displacement profile selected for the inputted parameters.

A tool is driven at substantially constant speed, while the tractors are accelerated, decelerated, stopped and started as dictated by the selected profile. The microprocessor systems each use a reference pulse train and positional feedback pulses (from rotational encoders) to closely control the motion of the mechanical process/web drive subsystems by comparing actual detected motion to desired motion and output appropriate digital signals which are converted to analog form to control the process and web driving motors.

Modules electronically coupled together (and/or with other equipment) can perform different web process functions in an independent and yet coordinated manner. For example one module can perform several cutting operations, such as perfing and punching, and another module can perform several numbering operations, with each module programmed to perform its respective function only, yet synchronized with the other module(s) or equipment as to overall (i.e. average) web throughput.

A cluster of modules can be rapidly reconfigured to build, alter or expand a web processing line without the physical problems typically associated with fixed in-line equipment. The line and modules are to a large degree size independent (i.e. a wide range of form depth(s) and width(s) can be accommodated under programmed electrical control). Modules may be placed on casters or the like, and a line created by simply wheeling modules into position, plugging them together, and positioning web to be processed across the modules in loose loop fashion. Any malfunctioning module can be quickly wheeled from the line and replaced. A new line may be created by unplugging unwanted modules and wheeling them away, wheeling and plugging in any desired additional modules, and wheeling the modules into any desired order. A user may begin with one or a few modules and add modules anytime desired. The modules should find application in traditional business form production facilities, sales offices, electronic printing ventures, and warehouse form processing installations, among others.

Form depths (lengths) are no longer a significant constraint. Utilizing modules to create forms, forms of any desired depth are possible without change of gearing, rings or the like. Specialized form depths are readily produced without change of equipment from the equipment utilized for any single, standard form depth.

These as well as other objects and advantages of this invention will be more completely understood and appreciated by careful reading of the following detailed description of the presently preferred exemplary embodiment, taken in conjunction with the accompanying drawings, of which:

FIG. 14 is a more detailed circuit diagram of the Watchdog Doctor subsystem of FIG. 11;

FIG. 15 is a simplified schematic diagram of the inter-module stop circuitry employed in the exemplary embodiment;

FIG. 16 is a schematic depiction of the geometry of a module suited to a folding web process;

FIG. 17 is schematic diagram of the geometry of a module suited for an infeed web process;

FIG. 18 is a simplified schematic diagram of the geometry suitable for a module performing numbering, diecut or imprinting web process functions;

FIGS. 19A and 19B are simplified schematic diagrams of suitable geometry for a perforation/cut off web process module;

FIGS. 25–29 are simplified flow charts of suitable computer programs for the microprocessor in the main servo drive subsystem of FIG. 11.

FIG. 1 is a generalized depiction of an exemplary web processing module constructed in accordance with this invention. Although the module is typically connected with other modules to form a more elaborate web finishing process line, it is depicted in a "stand-alone" mode at FIG. 1.

Figure 1:
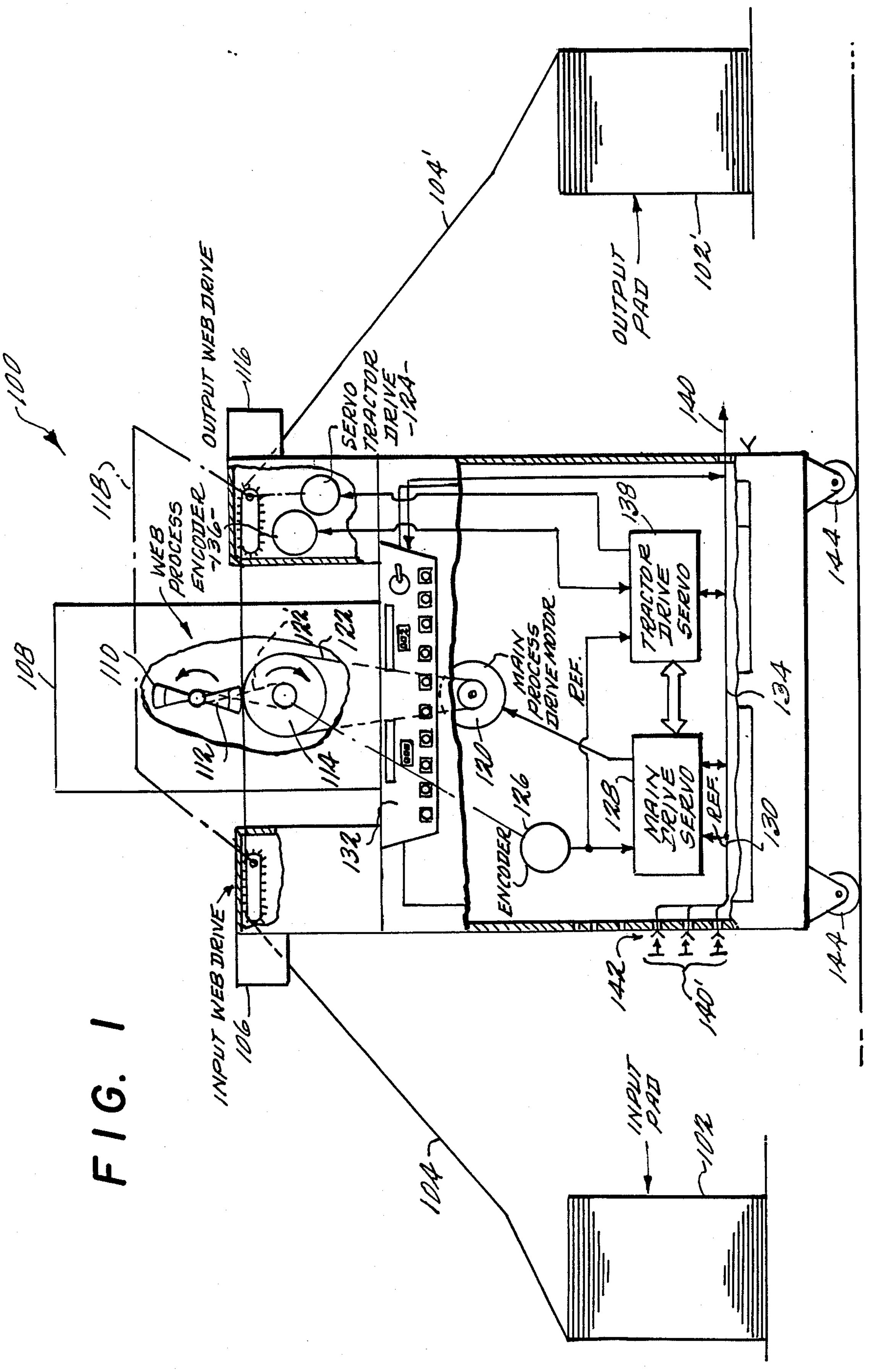
FIG. 1 is a schematic overview of an exemplary stand-alone module.

An input pad 102 provides a supply of paper webbing 104 to be further processed. In the exemplary embodiment, a sprocket type of tractor drive 106 positively feeds the input web 104 into a conventional web processing station 108 (e.g. a numbering process where numbering heads 110,112 are rotated at a constant velocity and cooperate with a counter-rotating platen 114 to print consecutive numbers or the like on the web material as it passes therebetween. In the exemplary embodiment, the active outer ends of the numbering heads 110,112 are disposed at the periphery of an imaginary cylinder having a 17 inch circumference thus defining an active process area each 8.5 inches of circumferential travel of such an imaginary cylinder (e.g. once for each 180° revolution of the printing head assembly 110,112). The output web drive 116 then positively outputs processed web 104' for stacking in an output pad 102'. In the embodiment of FIG. 1, the output web drive 116 is mechanically coupled to the input web drive 106 (e.g. by belting, chains, etc.) as indicated by dotted line 118.

The main web process 108 is driven at a constant velocity by drive motor 120 (e.g. via belt driving or the like as indicated by dotted lines 122). The input and output web drives 106,116 are commonly driven by a tractor servo drive motor 124. Each of these drive motors is included within its own velocity/displacement-controlled feedback loop. For example, a rotary encoder 126 is mechanically coupled to sense the actual position of the main process and to provide an input to the main drive servo circuit 128 which generates the necessary electrical drive input to the process drive motor 120 so as to maintain the process drive rotating at a constant velocity (as defined by a succession of reference pulses supplied to the main drive servo circuit from the inter-module bus at 130). In a stand-alone mode, the reference pulses actually are generated by a pulse frequency function generator included within the main drive servo circuit 128 and controlled from the operator's console 132. Alternatively, the reference pulses at 130 may be supplied from another module or other source via an inter-module electrical connection bus 134.

Similarly, a rotary encoder 136 is mechanically coupled to the web drive 106,116 so as to sense its actual position and to emit a train of representative pulses to a tractor drive servo circuit 138. The servo circuit 138 also receives its reference pulses from the process encoder 126 and then supplies an appropriate electrical drive signal to the web drive motor 124 so as to maintain the actual web drive at a desired, predetermined but programmable, relationship with respect to the process drive. As will be appreciated, if the process only contacts the web at certain times (e.g. twice per process revolution if two numbering heads 110,112 are used), then the web drive speed is only necessarily matched to the circumferential speed of the process at those times. During intervening times, the web drive mechanism may be programmed so as to slow down, speed up, stop, reverse, etc. the web drive so as to ensure that the next process contact with the web occurs at a desired position on the web.

Figure 2:
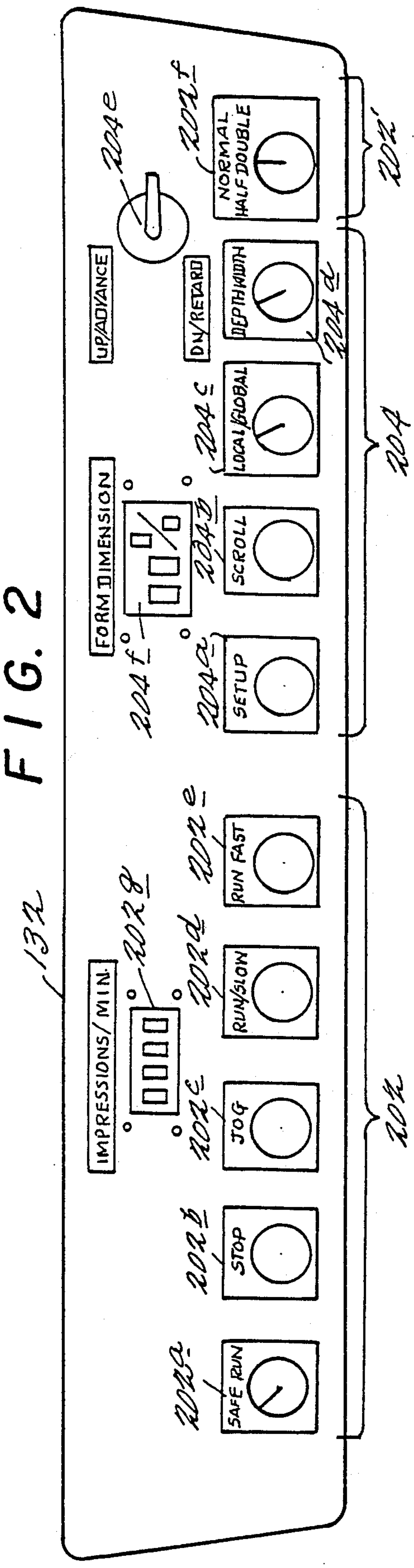
FIG. 2 is a more detailed view of the operator control panel for the module of FIG. 1.

Operator control and interface with the module 100 (and with any other module 100 appropriately coupled thereto via the inter-module bus 134) is accomplished via a control panel 132 which includes various manually actuated switches and visual displays (shown in more detail at FIG. 2).

At the output side of the module 100, the inter-module bus 134 extends into an external umbilical cord with connecting plug 140. At the input end of module 100, the inter-module bus 134 terminates in three sockets 142 which may each receive a connecting plug 140 from an upstream module (or from a suitable "translator" from other conventional devices located upstream or downstream in the web processing "line"). Plural input sockets 142 are provided so that plural upstream modules 100 may be connected in parallel to a single downstream module with appropriate merging of web materials for further common processing in the downstream module.

A safety stop interlock circuit is preferably also used so as to require a properly wired plug 140 to be inserted within each socket 142 before the module will operate. Accordingly, three additional "dummy" umbilical bus plug connectors 140' are also provided at the input side of module 100. In case there are any unfilled sockets 142 after a desired cluster configuration has been arranged, then any of the available dummy plugs 140' may be plugged into any empty sockets 142 to complete the stop circuit. There is also a special socket at the output side of each module. The umbilical cord of the final downstream module is plugged into its own such special socket to provide power to the stop circuit (which is actually a series loop circuit passing multiple times through all modules). In the "stand-alone" mode, all three of the dummy plugs 140' must be plugged into the infeed side sockets 142 and the umbilical cord must be plugged into its own special socket at the outfeed of the module to supply 24 volts to the stop circuit interlock.

It should also be noted that the module 100 is mounted upon casters 144 so that it may be easily rolled into and out of position within any given cluster of modules comprising a desired web finishing process line.

The module control panel 132 is shown in more detail at FIG. 2. Here, it will be seen that the left side 202 of the panel permits the operator to control the web process functions via main drive servo 128. The preferred layout of this left half 202 of the control panel is in a format that is more or less "standard" for the printing industry and thus easily understood by most operators. A speed control 202' is also available at the extreme right side of the panel for controlling the main servo drive speed (at start-up time) in relationship to other module process speeds.

The right half 204 of the control panel 132 permits the operator to program the tractor drive servo circuit 138. As will be explained in more detail below, when a plurality of modules 100 are connected in a cluster arrangement, the module control panel 132 of any one module 100 may be utilized to control the entire cluster of modules thus giving the illusion of a plurality of duplicate control panels distributed all up and down the process line (i.e. one at each module site).

The speed of the web drive relative to the process drive is controlled by a microprocessor-based servo circuit 138. By manipulating control panel switches at section 204, an operator may select a suitable "velocity profile" or form depth (i.e. length dimension). This operator selected and programmed profile is utilized by the tractor servo to match the speed of the web with that of the process while the process is in contact with the paper. It may then be used, if desired, to alter the web speed during the non-contact periods so as to move more or less paper under the process per process revolution. Up to four different sequential form depths may be selected by the operator to define the distances between process functions performed on the web. The form width simply defines the overall width of the web, and, in the exemplary embodiment, is used to control a transverse tractor drive system so as to space the tractor sprocket drive mechanisms at the appropriate cross machine dimension for the elongated web product to be processed.

For example, if a successive web numbering process is involved, and if programmed form depths of (a) two and one-half inches, (b) three inches, (c) five and one-fourth inches and (d) seven inches have been selected, the second imprinted number will print two and one-half inches after the first, the third imprinted number will print three inches after the second, the fourth imprinted number will print five and one-fourth inches after the third and, to complete the overall "repeat" cycle, the first imprinted number will print seven inches after the fourth.

The process drive has three operating modes (JOG, RUN SLOW, and RUN FAST) that are shared with the tractor drive. The process drive operates at a fixed speed whenever the jog button is depressed and at a variable speed when a run slow or run fast button is depressed. In addition, the tractor drive has a "wait-for-process" mode and a "set up" mode. The "wait-for-process" mode is not accessible manually but, rather, is automatically entered whenever the power supply is first energized or a form dimension is altered. If desired, the presence of such a mode may be indicated to the operator by displaying a message such as "HI" on one of the operator displays. Once the module is in the "wait-for-process" mode, it manually can be placed in the "set up" mode during which form width and depth dimensions are manually input. The microprocessor already "knows" when to speed match the process but placement of speed matching onto the web is operator adjustable during the "set-up" mode. (Note as explained below that PENM lets the tractor microprocessor "know" when the web-contacting head is going to hit and thus initiates the velocity match portion of a profile.) In the exemplary embodiment, the tractors can be moved manually when in a "wait-for-process" mode or "set-up" mode.

The process drive controls 202 and 202' may be used to operate the module 100 in the stand alone, cluster or speed following configurations. A conventional on/off switch (not shown) is of course also typically provided. In the exemplary embodiment, a startup warning audible alarm sounds for approximately one second whenever a JOG, RUN SLOW, or RUN FAST button is depressed. The identity and intended function of the process drive control switches 202 and 202' in the exemplary embodiment are explained in more detail below:

a. The "SAFE-RUN" switch **202*a*** is used to lock out all operating modes in the "safe" position to prevent an accidental start-up. The module drives (process drive and tractor drive) can be activated only when this switch is in the RUN position.

b. The "STOP" button **202*b*** is used to stop the module (process drive and tractor drive) when running in the RUN SLOW or RUN FAST or JOG mode.

c. The "JOG" button **202*c* is used to activate the module (process drive and tractor drive) at JOG speed. 28 impressions-per-minute (IPM) in the normal operating mode, as long as button 202*c*** is depressed. Module process again stops when the button is released.

d. The "RUN SLOW" button **202*d*** is used to activate the module (tractor drive and process drive) at RUN SLOW speed, 28 1 impressions-perminute if depressed when the module is stopped. If this button is depressed while the module is running at a speed faster than RUN SLOW speed, the module will decelerate as long as the button is depressed, or until the speed is reduced to JOG speed. The exemplary module does not have a speed control rheostat. Rather, the "RUN SLOW" and "RUN FAST" buttons regulate operating speed.

e. The "RUN FAST" button **202*e*** is used to activate the module (process drive and tractor drive) at RUN FAST speed, 28 impressions-per-minute if this switch is depressed when the module is stopped. If this button is depressed while the module is running, the module will accelerate as long as the button is depressed or until a maximum speed is reached.

f. The "HALF-NORMAL-DOUBLE" switch 202f is used to vary speed between clustered modules when form depths and process functions differ. This switch should be in the "NORMAL" position for stand-alone operation.

g. The "IMPTRESSIONS/MINUTE" readout 202g indicates module speed (process drive only) in impressions per minute.

The web drive controls 204 may also be used in the stand-alone, cluster or speed following module configurations:

a. The "SETUP" button 204a is used to place a module in the SETUP mode--when it is already stopped and only as long as button 204a is depressed. When this button is depressed, the "FORM DIMENSION" display 204f will indicate either the current form width or form depth (initially the first memory content is displayed, subsequently memory 2,3 and 4 contents may be scrolled into the display), depending upon the position of the "DEPTH-WIDTH" switch 204d. The form width and/or depth can only be changed while this button 204a is depressed.

The "SCROLL" button 204b is used to advance form depth memory selection when the "SETUP" button 204a is depressed and more than one form depth is to be entered, or to make coarse (0.020" increments) register adjustments when the UP-/ADVANCE-DN/RETARD switch 204e is moved from its neutral center position and when the "setup" switch is not depressed. The form depth memory selection advances each time button 204b is depressed and released. The first selected form depth memory will always indicate the form depth being examined or altered (last entry). The succeeding selected memories will either indicate the last form depth entered or E if no form depth has been entered. The form depth input into succeeding selected memories is always the distance between that impression and the one proceeding. For example: If two impressions are required: the first form depth entered should be the distance between the first and second impression. The second number entered should be the distance between the second and first impression (see FIG. 7 for a visual depiction of these relationships).

c. The "GLOBAL-LOCAL" switch 204c is used only with clustered modules. When switch 204c is in the "GLOBAL" position, any change in form width or depth entered by the operator at one module is entered automatically at all other modules which also have their GLOBAL-LOCAL switch in the "GLOBAL" position. When the switch 204c is in the "LOCAL" position, any dimension change for the module must be entered at that particular module and such entry will have no effect on any other module.

d. The "DEPTH-WIDTH" switch 204d selects the form dimension to be entered. When the switch 204d is in the "DEPTH" position, form depth data is entered. When switch 204d is in the WIDTH position, form width data is entered and the tractors will move to the entered cross-machine width when the "SETUP" button 204a is released. During a run condition, the "DEPTH-WIDTH" switch determines whether depth or width values are displayed.

e. The "UP/ADVANCE-DN/RETARD" switch 304e (3 position spring-loaded, return to center) is used to increase (UP/ADVANCE) or decrease (DN/RETARD) the form width or form depth figure displayed during setup, or to "fine tune" the registration during a run. (Note: The GLOBAL-LOCAL and HALF-NORMAL-DOUBLE switches are used only when the modules are clustered.)

f. The "FORM DIMENSION" readout 204f indicates form width or form depth (depending upon the position of DEPTH-WIDTH switch 204d) and process rotary register adjustment in increments of 0.002 inch when the UP/ADVANCE-DN/RETARD switch 204e is used to adjust registration "on-the-fly".

Figure 3A:
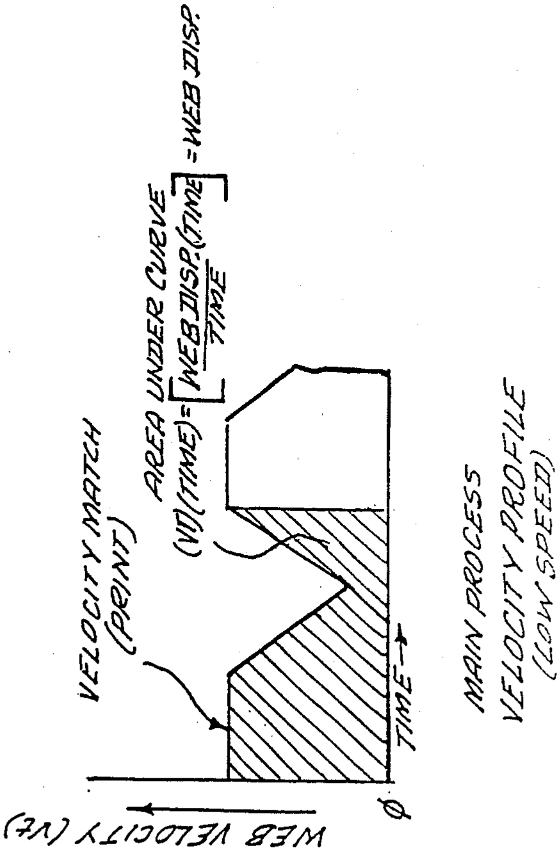
FIGS. 3A and 3B are graphical depictions of some typical velocity profiles.
Figure 3B:
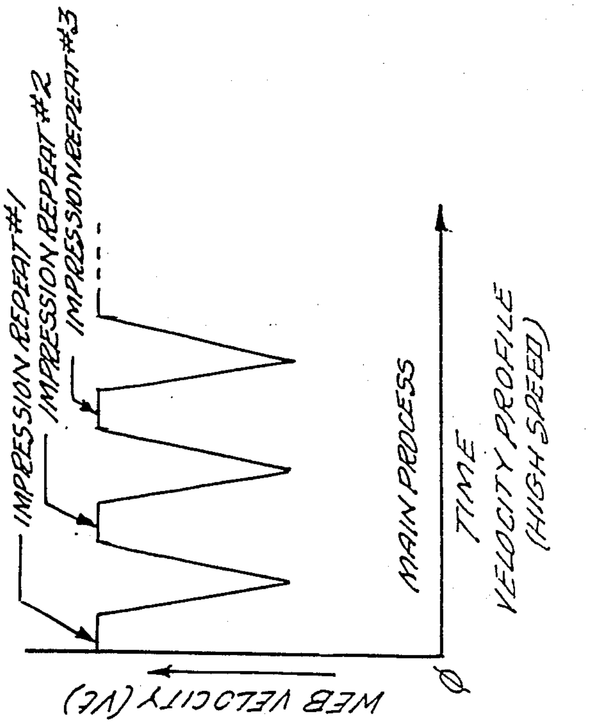

Since the relationship between web drive and process drive is under program control, the program may be defined by stored data defining a "velocity profile" as depicted in FIGS. 3A and 3B. As shown, a velocity match is maintained between the web and the process drive whenever an actual imprinting operation or the like is to be effected. Thereafter, the web drive is controlled (e.g. reduced in speed and then increased as shown in FIG. 3A) so as to achieve the next velocity match at the desired registration point on the web. Since velocity is plotted in FIG. 3A as a function of time, it necessarily follows that the area under the curve will be actual web displacement. Furthermore, since the main process velocity is constant, a predetermined circumferential travel of the process cylinder will correspond to a predetermined time as also indicated in FIG. 3A. In the example of FIG. 3A, a single form depth of 8½ inches is depicted as occurring at relatively low speed. If the speed of the process is increased, and the time scale remains the same, the velocity profile will appear as depicted in FIG. 3B. Namely, the 8½ inch repeat process occurs in a shorter time interval and the tractor velocity increases. The area under the curve for a given repeat cycle will, of course, remain the same.

Figure 4A:
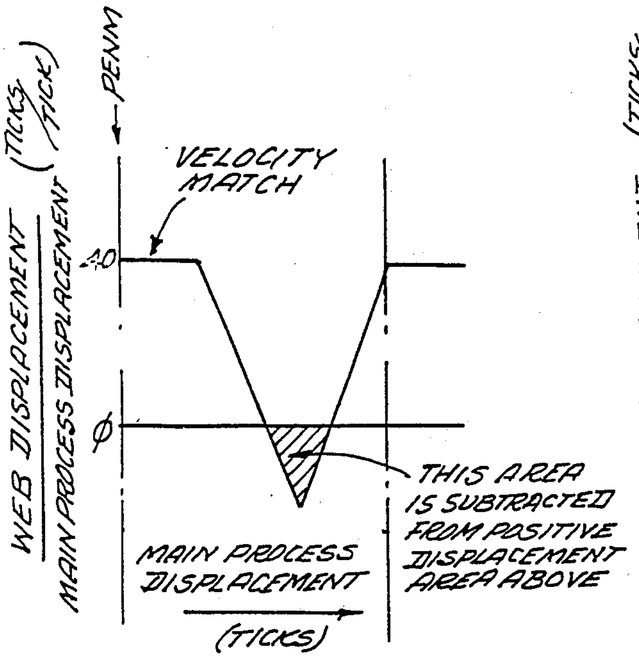
FIGS. 4A and 4B are graphical depictions of some typical, displacement profiles.
Figure 4B:
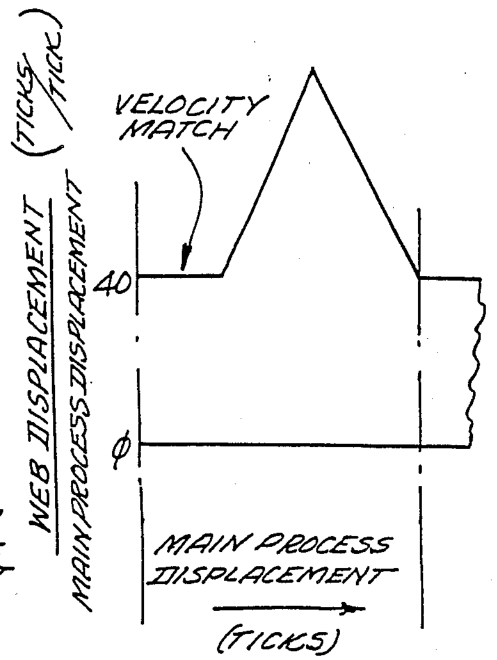

Similarly., the stored profile data may be maintained in terms of web displacement versus process displacement as depicted in FIGS. 4A and 4B. For example, in the exemplary embodiment the rain process encoder 126 is arranged to produce 12 pulses for each inch of process displacement (i.e. circumferential travel of a 17 inch process cylinder). The web drive encoder 136 is arranged to produce 480 pulses for each inch of web displacement (e.g. approximately 0.002 inch per pulse). Accordingly, if the web velocity is to be matched to the process velocity, then the web drive must be controlled to produce 480/12=40 web displacement pulses out of encoder 136 for each process drive pulse emanating from encoder 126. In FIG. 4A, the velocity match plateau is at a level of 40 web displacement "ticks" (i.e. pulses) for each main process displacement "tick" (i.e. pulse). In the example of FIG. 4A, a relatively short form depth is assumed such that the web displacement actually reverses for a time in the non-contact interval between repetitions of velocity matching. By contrast, when a relatively longer form depth (i.e. repeat interval between velocity match periods) is involved as depicted in FIG. 4B, the web displacement/velocity may actually be increased from the velocity matching plateau during the non-contact process periods.

Figure 5:
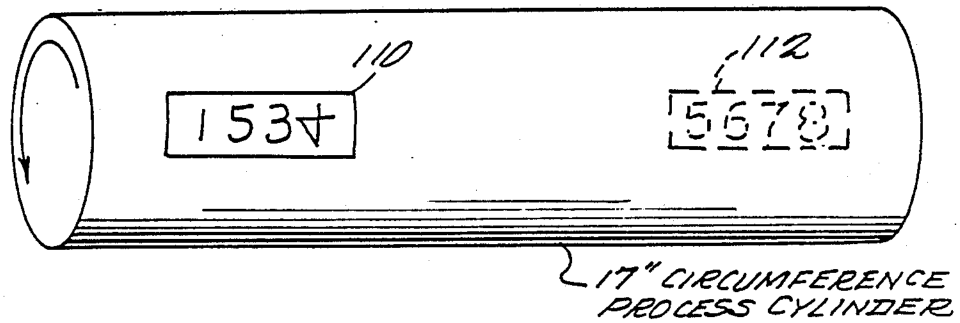
FIG. 5 depicts a particular configuration of numbering heads disposed on a rotating 17 inch circumference process cylinder.
Figure 6:
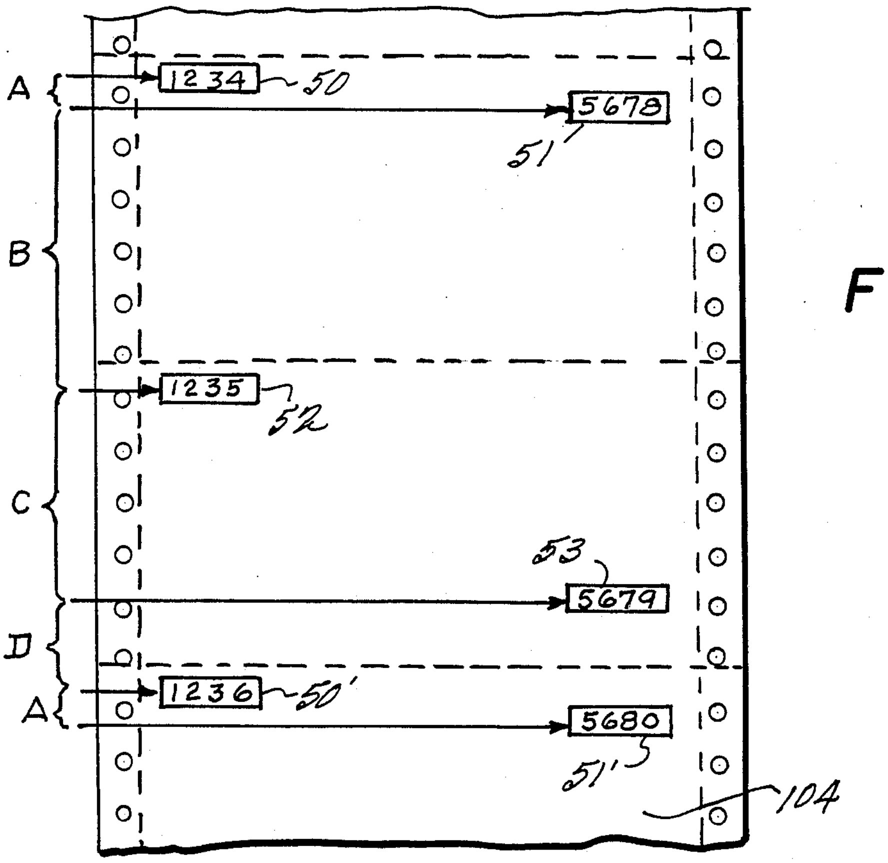
FIG. 6 depicts a web with successive form depths A–D after process by the numbering heads of FIG. 5.
Figure 7:
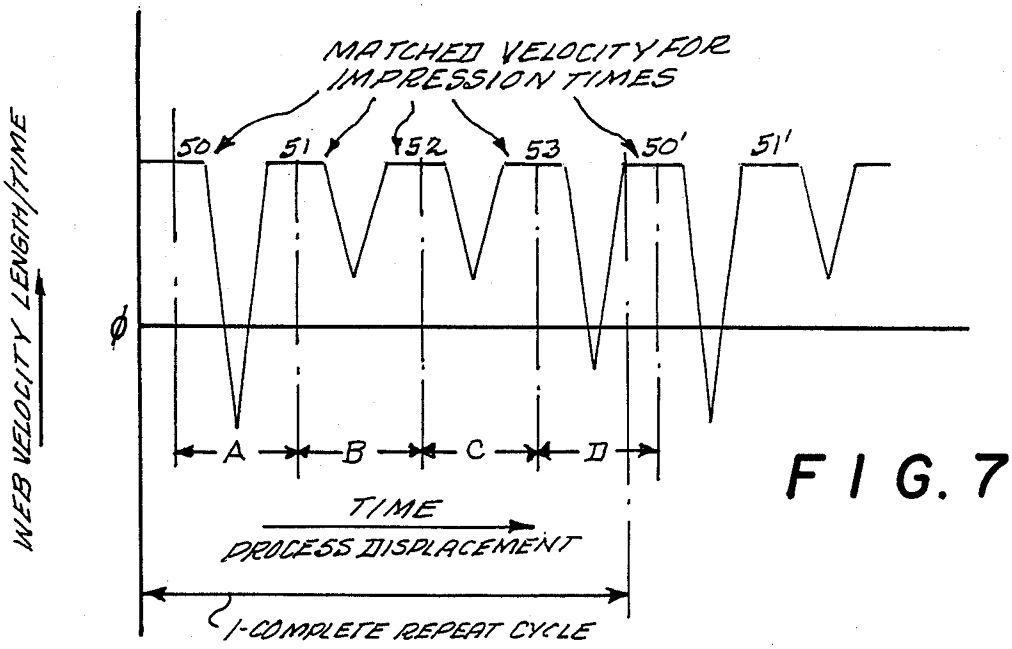
FIG. 7 depicts the web velocity profile for effecting the forms process depicted in FIG. 6.

A somewhat more complex web finishing operation is depicted at FIGS. 5–7. In FIG. 5, the 17 inch circumference process cylinder is schematically indicated. Actually, as will be appreciated the "cylinder" may only constitute an imaginary cylindrical surface at which the printing end of numbering modules 110,112 reside. As viewed in FIG. 5, from above, the numbering module 112 is in the process of imprinting the numeric designation "5678" while the numbering module 110 is out of contact, 180 degrees around to the top of the process cylinder, having just printed the numeric designation "1234" one-half rotation of the process cylinder earlier in time. As will be appreciated by those in the art, suitable cams or the like may be utilized to advance the numeric designation of numbering heads 110, 112 during each revolution of the process cylinder.

A section of the web 104 is depicted at FIG. 6 showing the desired pattern of printing by numbering heads 110, 112. For example, the numbering head 110 is desired to contact web 104 at locations 50, 52 and 50 50′ are spaced apart in a repeating pattern which includes intervals A+B (between locations 50 and 52) and intervals C+D (between positions 52 and 50′). At the same time, the numbering head 112 disposed to right hand side of web 104, is to sequentially print numerical indicia at locations 51, 53 and 51′ at repetition intervals which include displacements B+C (between impressions 51 and 53) and D+A (between impressions 53 and 51′).

This desired printing pattern may be achieved by programming the web displacement to produce four successive form depths A, 8, C and D in succession during each complete repeat cycle of a web finishing process. For example, as depicted in FIG. 7, a web velocity profile shows that the web is actually reversed (similar to the example of FIG. 4A) between impression times 50 and 51 so as to achieve a relatively short web displacement interval A therebetween. To a similar but lesser degree, web displacement is temporarily reversed between impression times 53 and 50′ so as to achieve web displacement interval D. During the remaining non-contact intervals, web velocity/displacement is simply slowed (similar to the examples of FIGS. 3A and 3B) between impression times 51, 52 and 53 so as to produce the relatively larger web displacement intervals B and C. As will be noted, on a linear time scale as shown in FIG. 7, there are always equal intervals between the matched velocity process contact times 50, 51, 52, 53, 50′, . . . because a constant process velocity has been assumed. The actual web displacement is of course unequal due to the fact that there is unequal area under the velocity profile during the respective intervals A, B, C, and D.

In the exemplary embodiment, the actual time of process contact 50, 51, 52, 53, etc. is chosen to be at the center of a matched velocity interval or plateau on the web velocity profile. It should be appreciated that the exact location of the impression on the web (i.e. the registration of the imprinted indicia on web 104) may be easily advanced or retarded by simply advancing or retarding the read out process of the stored velocity profile data which controls the web drive motor motion as a function of detected actual process motion. In the presently preferred embodiment, registration adjustment is actually accomplished by incrementing or decrementing the instantaneous tractor reference position and then permitting the tractor position loop control to automatically respond.

The full or "expanded" profile table may actually comprise an ordered sequence of stored numerical data representing a desired succession of tractor displacement pulses (one each 1/480) inch) for a corresponding succession of process displacement pulses (one each of 1/12 inch):

TABLE I

| Sensed Process Displacement Increment (Relative RAM Location To Be Addressed Upon Interrupt | Desired Tractor Displacement Increment Data |
|---|---|
| 1 | 40 |
| 2 | 40 |
| 3 | 40 |
| 4 | 40 |
| 5 | 40 |
| 6 | 38 |
| 7 | 36 |
| 8 | 34 |
| 9 | 32 |
| 10 | 30 |
| 11 | 32 |
| 12 | 34 |
| 13 | 36 |
| 14 | 38 |
| 15 | 40 |

(There may be, for example, 102 such data entries for an 8.5 inch process displacement.)

It will be appreciated that this ordered sequence of data values defines a desired velocity profile of the type shown in FIGS. 3A and 3B where the "matched" velocity portion of the profile is represented by the stored "40" data values. Thus, each time a process increment of 1/12 inch is sensed, an interrupt controlled subroutine may be used to fetch the next stored table value, increase or decrease it in relative value as may be required in accordance with conventional servo feedback control loops, and use the result to drive the web drive motor.

To save space in the EPROM, a library of available velocity profile tables may be stored in a condensed format:

TABLE II

| Bytes Of Profile Velocity Table | Data Contents |
|---|---|
| Byte #1 | Integer Form Depth |
| Bytes #2, 3 | Display |
| Bytes 4 | Length of required speed match (e.g. must equal maximum process web contact time) |
| Byte 5 | Overall process "repeat" length |
| Byte 6, 7 . . . | One profile data value/byte for first half of symmetrical speed change. |

A suitable algorithm may then be designed to "expand" such a compressed set of ROM values into a full blown RAM profile (e.g. as in Table I) ready for use at the time it is selected by operator programming operations as should now be understood.

Since conventional web process stations 108 may be utilized to achieve a wide variety of desired web finishing functions, it should be understood that the design/operation of any given module may be somewhat "customized" to the particular web process at hand. For example conventional process make-ready requirements (e.g. such as ink train adjustment, number cam set up, punch and/or perforated blade installation, etc.) will be the same as those normally encountered.

In a stand-alone mode of operation, after the umbilical cords are properly configured (to ensure that all sockets are properly filled with a plug and the last downstream umbilical cord is plugged into its own special socket) and the module is turned "on", the form dimension display 204*f* should read "HI" and the impressions/minute display 202*g* should read "0" (it may be programmed to read "STOP" if the safe/run switch 202*a* is in the "safe" position and/or one of the umbilical cord plugs is not properly terminated, etc.).

The width of the form to be processed is then programmed into the module by setting the depth/width switch to width, and depressing the set up button 204*a* (and holding it down) while observing the form dimension display 204*f*. The display may be counted either up or down by manually positioning the switch 204*e* until the proper web width appears at display 204*f* whereupon switch 204*e* may be released to its neutral center position and the set up button 204*a* released. A transverse sprocket driving mechanism may be provided to automatically drive the sprocket drives to proper width position in the module.

The operator may then determine the desired successive form depths to be run. For example, it may be desired to add a "strike in" print image once on each form at a location registered 4⅓ inches from the top of an 8½ inch form. If so, since only a single imprint is desired for each half revolution of a 17 inch circumference process cylinder, then the actual repeat length 8½ inches should be programmed in for a single form depth. Accordingly, the depth/width switch 204*d* should be placed in the "depth" position after which the set-up switch 204*a* is depressed while the up/down switch 204*e* is manipulated to achieve the proper form depth display at 204*f*. While maintaining the set-up switch 204*a* depressed, the scroll switch 204*b* is then depressed and released one time. Since only a single form depth is to be entered under this example, the up/down switch 204*e* may simply be held in the down position until the display reads "E" for empty. The operator may similarly scroll to the remaining two form depth memory positions and set them all to "E" whereupon the set up switch 204A may then be released and the form dimension display should now read "HI" indicating that the web tractor drive mechanisms can be advanced or retarded manually for coarse registration. (Note that a process "marker pulse" comes in at the beginning of the speed match time, by definition.)

The "run slow" button 202*d* may then be depressed and the operator may visually observe the registration of the imprinting on the web. The advance/retard switch 204*e* may then be manipulated so as to adjust the registration (in 0.002 inch increments) as needed to achieve proper final registration. Once proper registration is thus achieved at the slow (28 impressions per minute) speed, the "run fast" button 202*e* may be depressed and held until the desired speed is achieved as may be determined by visual inspection of the display 202*g*. the entire process may be stopped by operator depression of button 202*b* at any time.

Figure 9:
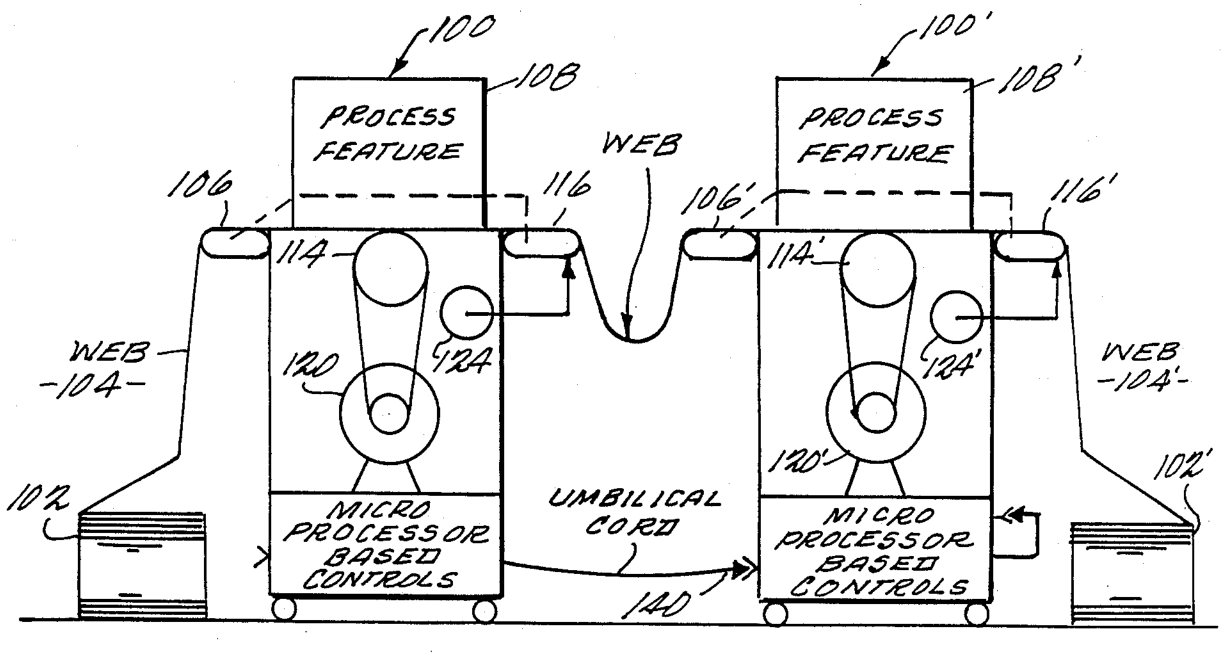
FIG. 9 is a simplified schematic depiction of two serially connected modules.

As noted earlier, the modules 100 also may be grouped together in clusters to form an independent production system as shown in FIG. 9. When two or more modules 100, 100' are so grouped or clustered, the process drive of each module in the cluster functions just as when a module is operated in the stand-alone mode—except that the pulse function generator associated with the main process drive of one of the modules (e.g. the one having the control panel from which the operator initiates a given run) supplies the reference pulses to the main drive servo loop for all other process drives connected in the cluster. Operation of a SAFE-RUN switch 202*a*, a STOP switch 202*b*, a JOG switch 202*c*, a RUN SLOW switch 202*d*, or a RUN FAST switch 202*e* in any one module affects all modules within the group. However, the speed indicated in the impressions/minute display 202*g* in each module represents only the speed for that particular module.

The tractor drive controls 204 in a cluster of modules operate somewhat differently from those encountered in the stand-alone module. For example, the global/local switch 204*c* is not even used in the stand-alone operation but, in the cluster mode, this switch may be used to pass information from one module to another on a selected basis. For example, the global/local switch 204*c* may be used to pass form dimension data from one module to all other . having this switch also positioned in the "global" position. At the same time, if one wants to avoid sending such data to any particular module, its switch 204C may simply be left in the "local" position thus maintaining it isolated from the other modules and permitting it to have different form depth data.

The half/normal/double switch 202*f* is also typically utilized in the cluster mode. During most operations this switch will simply remain in the center/normal position. However, if the operator wishes one module to run at half the process speed of other modules, then switch 202*f* of that particular module must be placed in a "half" position If so, then the impressions per minute display in that particular module would read half that appearing in the displays 202*g* of other modules. Similarly, if the switch 202*f* of any given module is placed in the double position, then that particular module will operate at a process speed which is twice that of the other modules. This feature is particularly useful in the cluster mode since it permits using different processes 108, 108', etc. which may have to run at process speeds that are related by integer multiples of two (e.g. in an exemplary embodiment where one process has two contact intervals per revolution). The switch is examined by software during startup and ignored the rest of the time to prevent sudden change in velocity of the module. It is included in the control panel to allow one module to print two impressions (double speed) for every single impression of the rest of the line (normal speed). In one example, a "number" module could be run in the double mode while the "imprint" module is run in the normal mode. As a result, the "imprint" module will only mark one impression for every two impressions of the "number" module. An alternate way of achieving this relationship would be to put the "imprint" module in the half mode, and the "number" module in the normal mode.

When two or more modules 100, 100' are configured in a cluster as shown in FIG. 9, the operator typically removes one of the dummy plugs 140' from one socket in the infeed side of a downstream module and plugs an umbilical cord plug 140 thereinto from the output side of an upstream module. The umbilical output cord 140' of the downstream module is then plugged into a special socket on the output side of this last downstream module to complete the umbilical bus cord loop.

Figure 8A:
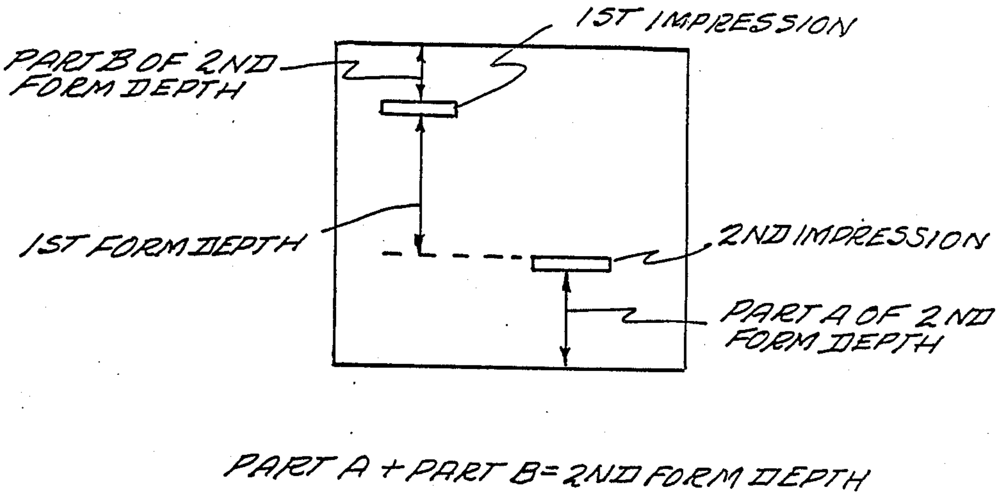
FIGS. 8A and 8B depict a typical forms which may be created by processing webs with the module of FIG. 1.
Figure 8B:
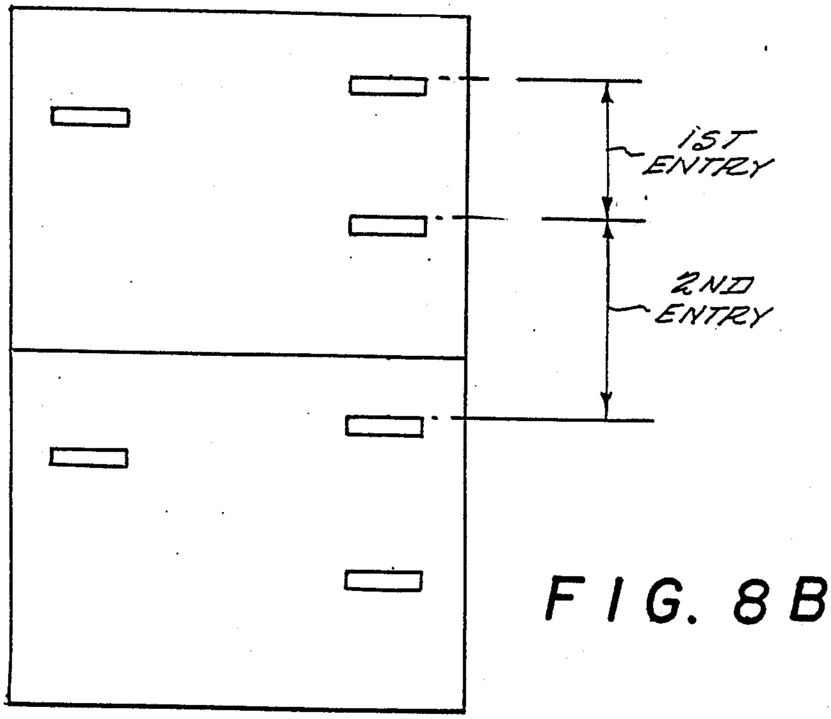

As an example of one type of cluster operation, it will be assumed that one needs to produce an output pad 102' of forms which have been numbered twice and imprinted once on each form in specific locations as shown at FIG. 8B. It is assumed that the overall form is 8½ inches long and 5 inches wide. The first number impression is to be placed ½ inch from the top of the form and the second number impression is to be located 4 inches from the top of the form. The single imprint to the left side of each form is to be placed 7 inches from the top of the form.

To realize this desired web finishing process, a specialized web finishing line may be configured by clustering a numbering module 100 and an imprinting module 100'. In this particular example, either module could be located upstream of the other. The depth/width switch 204*d* of each module should be place in the "width" position and the global/local switch 204*c* of each module should be placed in the global position (e.g. so that form dimension data entered into one module may automatically be entered into the second thus avoiding the need for operator duplication of effort and possible erroneous subsequent entries). The set up switch 204*a* on one of the modules may then be depressed and the form width entered into display 204*f* by manipulating the up/down switch 204*e* as previously explained. Once the correct form width (e.g. 5 inches in the example) appears in display 204*f* , the up/down switch 204*e* is released to its neutral position and the set up button 204*a* is released whereupon the form width data thus entered will automatically be transmitted via the umbilical cord to the other module and the transverse drive motors of both modules will move the sprocket drive tractors to the correct width position.

Assuming that the first module 100 is the imprinter, then its switch 204C should now be placed in the "local" position so as to prevent form depth data entered here from being also entered into the numbering module 100'. Then, the depth/width switch 204D of module 100 is placed in the depth position and, since the form is to be imprinted only once each 8½ inches interval, then 8½ inches is entered into the first form depth memory of module 100 and the remaining three form depth memories are all reduced to an empty or "E" condition.

The second module must be set up to handle two different form depths because the numbering is to appear at two different intervals. Accordingly, after the depth/width switch 204*d* of module 100' is placed in the "depth" position, the set up button in 204*a* is depressed and the up/down switch 204*e* is manipulated so as to first enter form depth 3½ inches (the distance on the form from the first number to the second number as depicted in FIG. 8B) and then the scroll button 204*b* is actuated and the second form depth memory is then set to the second entry of 5 inches (e.g. the distance from the second number position to the first). The remaining two form depth memories of modules 100' are then set to empty or "E" before the set up button 204A is released. Thereafter, the web 104 may be threaded through both modules with a loose loop therebetween as indicated in FIG. 9. The web may be manually moved within each module so as to achieve approximate desired registration of the process with the web in each module. The numbering module is placed in "double" speed mode (or, alternatively, the input module is placed in "half" speed mode) so as to effect two numbering operations and one imprinting operation for each complete "repeat" interval. Then the run slow button 202*d* in one of the modules may be depressed thus causing both modules to begin running. By visual observation, the operator may then manually adjust registration in each module by manipulation of the advance/retard switch 204*e*. Once both of the modules are properly in registration, the run fast switch 202*e* on either one of the modules may be depressed and both modules will increase in speed until a desired speed is reached as indicated by the display 202*g*. As should be appreciated, the registration process may be performed individually in the first or upstream module and then in each successive downstream module in succession.

Figure 10:
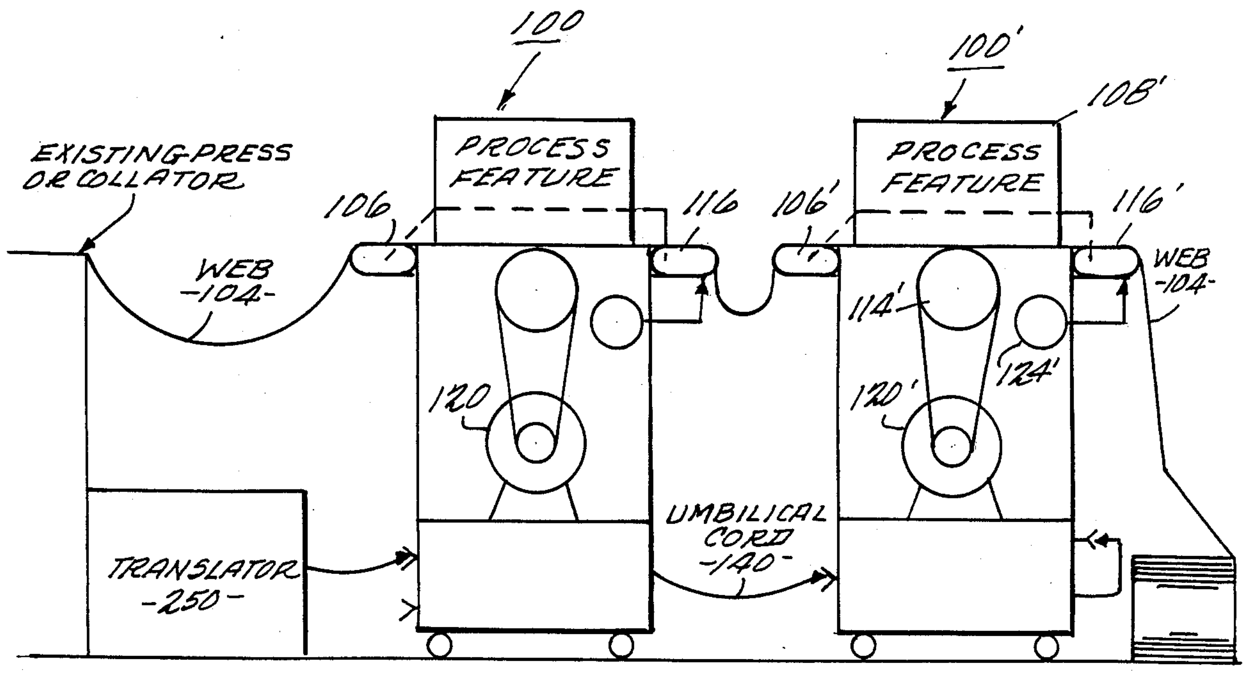
FIG. 10 is a simplified schematic depiction of two series connected modules connected to speed follow an existing press or collator or other web processing device.

One or more of the modules 100 may also be used in a hybrid configuration with an existing press, collator or other similar equipment by interposing an appropriate "translator" device as depicted in FIG. 10. Here, the translator device 250 is configured to interface between the module umbilical bus circuit 134 and the electrical control circuits of the existing cascaded machinery. For example, the translator device 250 may sense the process speed of the existing press or collator and produce appropriate process reference drive pulses for the umbilical bus circuit 134 of modules 100, 100', etc. Alternatively, the existing devices may already produce appropriate reference pulses or may do so after appropriate translation of the frequency, amplitude, etc. so as to fit the designed parameters of the inter-module bus circuit 134. Such configuration as shown in FIG. 10 may be referred to as hybrid clusters where the standard production equipment becomes a "dumb" master drive in the process velocity of the modules 100, 100' The translator 250 may, in some embodiments, simply comprise an appropriate encoder (e.g. a gear tooth pickup) installed at some appropriate point of the process in the existing machinery so as to generate main process drive pulses (e.g. one process drive pulse for each desired 1/12th inch of process displacement). The translator 250 may also be designed to allow "run" buttons 202*d* and 202*e* (and possibly the jog button 202*c*) of any one of the modules 100, 110', etc. to activate similar functions in the existing machinery (this especially feasible since the layout of the process control switches 202 is similar to that commonly used on existing press machinery). All stop buttons 202*b* on the modules or on the existing machinery should also be connected via translator 250 so as to function in the normal manner (typically with the rate of deceleration being dependent upon the deceleration achieved by the "dumb" master existing device.)

The translator, which allows dumb masters to control a module cluster, is a device which may be implemented at several different levels of sophistication. At its simplest level, the translator is a microprocessor based system which:

1. changes pulses from an encoder mounted on the dumb master into a form which is compatible with the intermodule bus,
2. holds down the dumb master bus line to indicate that a dumb master is on line, preventing other modules from entering the "master" status or taking "plock" low,
3. provides relay contact closures to the dumb master indicating the status of the jog, run slow, and run fast module buttons,
4. controls the "plock" line during encoder activity on the dumb master, and
5. provides stop circuitry interlocking between the cluster and the dumb master.

A more sophisticated translator may receive form dimension transmissions from a cluster and electronically (via software) alter the resolution of the dumb master encoder to accommodate dumb masters which are "size changeable" by cylinder circumference change, or some other mechanical means. The limited translator can only operate on a size changeable dumb master by changing the encoder resolution or encoder drive ratio gearing.

In one exemplary embodiment, a 14 inch Didde-Graphics 860 numbering unit, modified to a 17 inch circumference process cylinder dimension, may be mounted for conventional operation as the web process unit 108. Such conventional numbering module is capable of producing bar code, gothic, OCR or MICR quality numbering on form depths from 0 to 16 inches in fractional increments of 1/6 inch, ¼ inch, ⅓ inch, ½ inch, ⅔ inch, ¾ inch and 5/6 inch. In this particular exemplary embodiment, the maximum web width may be 21 inches and maximum print width may be 20¼ inches. As should also be appreciated, the extent of web displacement during each level plateau of velocity matching in a given velocity profile, may determine a maximum height of numerical indicia or other imprinted material.

Figure 11:
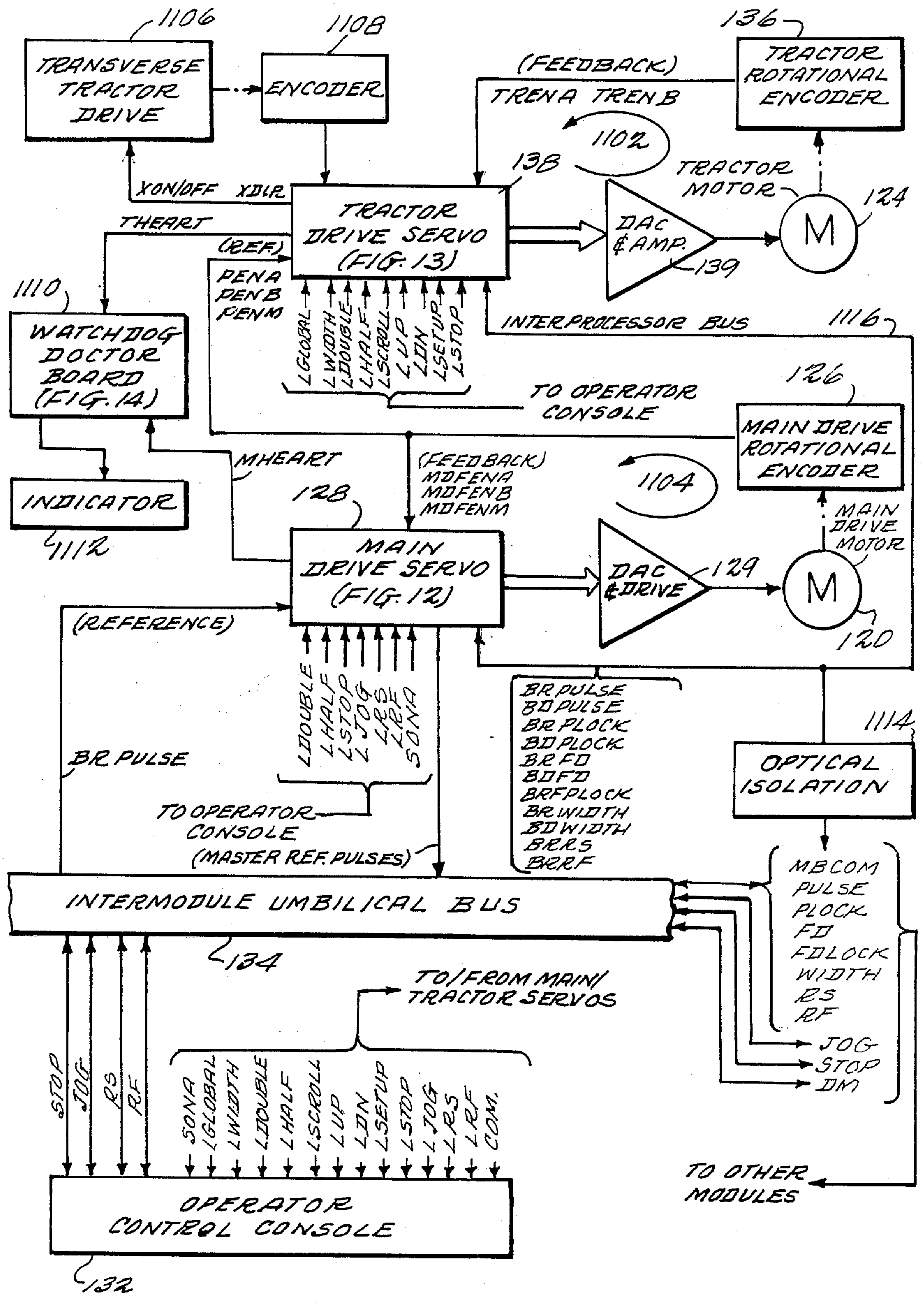
FIG. 11 is a simplified overall block diagram of the tractor servo and main servo velocity control loops and other circuits such as the umbilical bus line and operator console and the like associated with the module of FIG. 1.

The microprocessor-based controls for module 100 are shown in more detail at FIGS. 11–15 (hardware) and FIGS. 20–28 (software). The overall architecture of the hardware system is depicted at FIG. 11. There, the tractor drive's velocity controlled servo loop 1102 and the main drive velocity controlled servo loop 1104 are again depicted as comprising: (a) a tractor drive servo 138, tractor motor 124 and tractor rotational encoder 136 (in servo feedback control loop 1102) and (b) the main drive servo circuit 128, main drive motor 120 and main drive rotational encoder 126 (in servo feedback loop 1104). As will also be apparent from FIG. 11, these servo controlled feedback loops 1102 and 1104 actually utilize digital signals with appropriate digital-to-analog converters (and associated amplifiers) 139, 129 respectively being used to convert the digital output of the servo drive circuits into appropriate analog signals for actually driving the tractor motor 124 and main process drive motor 120.

Significantly, and as already noted above, the main drive rotational encoder 126 is utilized as the source of reference pulses for the tractor drive servo loop 1102 while reference pulses for the main drive servo loop 1104 are read from the inter-module umbilical bus circuit 134. In this manner, the main process drive is slaved to pulses appearing on the inter-module bus 134 while, in turn, the tractor servo loop is slaved to the process drive—but in a controlled programmable manner so as to follow prestored velocity/displacement profile data.

A tractor drive servo circuit 138 is also utilized to control a transverse tractor drive 1106. This drive controls the cross-machine dimensions between a pair of sprocket tractor drives (e.g. with suitable slide bearings and a rotationally driven lead screw arrangement). The actual cross-machine position of the transversely movable sprocket drive assembly is detected (or an equivalent rotational position of the lead screw drive mechanism is detected) via a suitable electromechanical pulse transducer/encoder 1108 so as to provide appropriate feedback to the tractor drive servo circuit 38. In this manner, programmed form width data may be utilized to control the cross machine dimension between the tractor drive assemblies on both the input and output drives 106, 116 of a module.

The tractor drive servo circuit 138 and main drive servo circuit 128 each comprise a microprocessor-based digital data processing circuit which will be explained in more detail with respect to FIGS. 13 and 12 respectively.

In general, the tractor servo circuit controls tractor motion and dimension data transmission/reception on the inter-module bus. This communication is serial in nature, similar to an RS232 interface. The tractor servo circuit also has the responsibility of controlling operator interfaces concerning form dimension (the right half 204 of the control panel) and registration.

The main servo controls the motion of the main process and also has the ability to function as a pulse generator to generate the line speed reference pulse train onto the intermodule bus, as well as receive the reference pulse train from other modules and follow it. Any module in the cluster may become the "master module", generating the pulse train, but this function is transparent to the operator. That is, the operator may control the speed of the cluster from any module whether or not that pulse module is the "master" which generates the reference pulse train. The operator is unaware of any master/slave relationship between the modules. The cluster appears to operate as one single machine to the operator.

Because the entire line is run from a single master generated pulse train, any perturbation in the actual speed of one module does not effect the rest of the cluster. The very nature of this scheme yields inherent dynamic stability.

The desired motion of the tractors is, in a sense, selectable by the operator. The operator may choose between a series of desired "velocity profiles" which the tractor servo controller has available in EPROM. These reference profiles are presented as "form depths" to the operator.

Each profile is represented in EPROM as a series of values which are used as both reference displacements and velocities to the motion control algorithm. The profile tables may be created off line (e.g. by a basic program which generates an ASCII file which is then, in turn, assembled to result in a file which can be burned into an EPROM).

The resolution of the main process encoder is 1/12 inch of process displacement per "tick", and the resolution of the tractor rotary feedback encoder is 1/480 inch web displacement per "tick". The values stored in the profile table are the tractor displacement desired for each 1/12 inch main process distance. Seen in this light, a new reference position may be generated by adding table values to the present reference position, and position error may be determined y comparison of reference position to actual position.

The other function of the values in the profile table is to provide a desired velocity value relative to the main speed.

The process may work as explained below.

The occurrence of a main process encoder pulse generates an interrupt which is serviced by the tractor servo controller. This interrupt represents a displacement of 1/12 inch in the main process. The interrupt handling routine first reads a real time clock counter which yields a "period", or number of real time clock counts since the last interrupt. The real time clock frequency is 2 MHz. The real time clock count is divided into a constant value which results in a "raw" DAC value which is a direct function of main process speed, or main process encoder frequency. If no position control were implemented, this value would then be multiplied by the profile table value. The product of this multiplication would be the actual value output to the DAC. Due to the resolution considerations, this product is actually divided by 16. This sort of number manipulation in the system design allows all mathematical operations to be integer operations, thus greatly increasing processing speed. In this sense, the entire system design (mechanical hardware, electronic hardware, and software) should be designed from the "top down" because the microprocessor may not be fast enough to implement a "scratch pad" type of algorithm. (Careful consideration must be given to potential accumulated computational errors due to truncation and resolution.)

When position control is implemented, the value read from the profile table is modified in such a fashion as to keep the tractors as close as possible to a desired instantaneous position. The processing of the profile table value with the positional error value is a key to system stability and accuracy. The position error is compared to the last position error, thus incorporating some "history" in the motion control. The amount of influence this instantaneous position error has on the final DAC output is weighted by the speed of the main process and whether the position error is increasing or decreasing.

When the 16 bit real time clock counter overflows, this indicates that the main process is standing still, and a different, similar (proportional) motion control algorithm may be automatically implemented.

Because of its high resolution, the tractor position feedback encoder frequency is too high to be handled directly by the microprocessor. The actual position of the tractors is recorded in real time via a quadrature steering network and two 16 bit counters (Intel 8254A). One counter represents forward motion of the tractors, while the other represents reverse motion. The counters may be read "on the fly" by the microprocessor and the difference is representative of the actual instantaneous tractor position. The counters are allowed to "wrap around" with no adverse effects.

In study of the motion control, the mechanical assembly, the high performance servo motor, the linear amplifier, the velocity feedback tachometer, and the 12 bit DAC were treated as a first order system. It was noted that an open loop step function into the DAC caused a change in velocity not unlike a capacitor discharge curve (it should be noted that "open loop" means no position feedback; however, the tachometer velocity feedback was still implemented).

The final implementation of the motion control software included values (or "weights" of the position error processing) that were developed empirically. However, the system has been shown to be stable under a variety of mechanical characteristics, including a system which drives only one tractor tower instead of the normal two.

The motion control implemented in the Main Process Servo Microprocessor circuit is similar in nature to the tractor controller, but much coarser. In this case, the reference is derived from a pulse train off the inter-module bus, each pulse representing 1/12 inch main process displacement. These pulses are generated by a counter on any one of the Main Servo circuits which may be the temporary master during a given run. The feedback encoder mechanically attached to the main process may also double as the reference encoder to the tractor drive system.

The main processes of two modules running together may vary at a given instant by up to several inches in position without any problems. This is due to the fact that the modules can effectively have as much slack web between them as required by the particular motion of the desired form depth. Because the web is slack between the modules, mechanical alignment is not an important consideration in set-up.

In the exemplary embodiment, the computer programs for these digital servo circuits 138, 128 are designed so as to generate numerous "heartbeat" output pulses at short intervals if they are functioning in a "healthy" manner. For example, each program loop of the computer software may include suitable instructions to cause an output pulse each time it is traversed. The result is a relatively frequent train of tractor heartbeat pulses on line THEART in FIG. 11 and a similar relatively dense train of main heartbeat pulses should occur on line MHEART in FIG. 11. These trains of expected pulses are monitored by a watchdog doctor board (more detail shown in FIG. 14) which looks for any "missing" heartbeat signals (e.g. time intervals greater than some predetermined threshold between successive heartbeat signals). If any missing pulses are so detected by the watchdog doctor board 1110, then the health indicator 112 (e.g. e visual LED output) is turned off (or on) to indicate a possible failure condition. Shutdown is also programmed to occur automatically if a loss of "health" is so detected.

As indicated in FIG. 11, certain of the control lines are buffered by conventional optical isolation at 1114 disposed between the inter-module umbilical bus 134 and the local bus communication line 1116 between the tractor and main servo drive circuit 138 and 128. A conventional two-way signal transfer is permitted by the optical isolation device 1114. These and other control lines (including bus signals and encoder signals) connected between the operator console 132 and/or the tractor drive servo circuit 138 and/or main drive servo circuit 128 are depicted using the following nomenclature in FIG. 11:

LGLOBAL = Active when local switch **204*c*** is in the "global" position
LWIDTH = Active when local switch **204*d*** is in the "width" position
LDOUBLE = Active when local switch **202*f*** is in the "double" position
LHALF = Active when local switch **202*f*** is in the "half" position
LSCROLL = Active when local switch **204*b*** is depressed
LUP = Active when local switch **204*e*** is in the "up" position
LDN = Active when local switch **204*e*** is in the "down" position
LSETUP = Active when local switch **204*a*** is in the "setup" position
LSTOP = Active when local STOP relay is not energized
LJOG = Active when local JOG switch **202*c*** is depressed
LRS = Active when local RUN SLOW switch **202*d*** is depressed
LRF = Active when local RUN FAST switch **202*e*** is depressed
BRRS = Bus Read Run Slow bus signal line
BRRF = Bus Read Run Fast bus signal line BRPLOCK=Bus Read Pulse LOCK bus arbitration control line BRFDLOCK=Bus Read Form Dimension LOCK bus arbitration control line BRPULSE=Bus Read PULSE process control line BRFD=Bus Read Form Dimension serial data line DUMB MASTER=Bus Read DUMB MASTER on line MHEART=Main HEARTbeat signal line THEART=Tractor HEARTbeat signal line SONA=Initiate an audible SONAlert output BDPLOCK=Bus Drive Pulse LOCK bus arbitration control line XON/OFF=Active when transverse drive motor is to be energized.

XDIR=Control line determining direction of transverse drive

BDFD=Bus Drive Form Dimension serial line

BDPULSE=Bus Drive PULSE process control line

XTENA=Xverse Tractor ENcoder phase A output

XTENB=Xverse Tractor ENcoder phase B output

PENA=Process ENcoder phase A output

PENB=Process ENcoder phase B output

PENM=Process ENcoder Marker output (twice per revolution)

MDFENA=PENA=Main Drive FEedback ENcoder phase A output

MDFENB=PENB=Main Drive FEedback ENcoder phase B output

MDFENM=PENM=Main Drive FEedback ENcoder Marker output (twice per revolution)

TRENA=TRactor ENcoder phase A output

TRENB=TRactor ENcoder phase B output

The inter-module umbilical bus includes, for example, the following lines.

MBCOM=inter-module Bus Common ground line

PULSE=inter-module process PULSE control line (connected to BDPULSE and BRPULSE through optical isolators). This line may be driven by any module. The pulse frequency determines cluster process speed. A module running independently in the "stand-alone" mode still runs slaved to this bus line.

PLOCK=Inter-module Pulse LOCK bus arbitration line (connected through optical isolators to BRPLOCK and to BDPLOCK). This line prevents modules from gaining control of PULSE when already active.

FD=Inter-module Form Depth serial data line (connected through optical isolators to BDFD and BRFD)—may be similar to RS 232 type serial data transmission.

FDLOCK=Inner module Form Dimensions LOCK bus arbitration line (connected through optical isolators to BRFDLOCK)—similar to PLOCK except used in association with FD line.

DM=Inter-module Dumb Master line (connected to BDDM and BRDM)

RS=Inter-module Run Slow control line (connected through optical isolators to BRRS)

RF=Inter-module Run Fast control line (connected through optical isolators BRRF)

JOG=Inter-module JOG signal line

STOP=Inter-module stop circuit

Signalling protocol on the inter-module bus 134 in the exemplary embodiment includes:

STOP=Must be "low" to run process

JOG="low" is active state

RS="low" is active, —slow or decelerate motion

RF="low" is active—fast or accelerate motion

PLOCK="low" means some module has control (is the master) and system is in "run" mode PULSE="low" going pulse represents desired 1/12 inch displacement of main process FDLOCK="low" means form dimension data (i.e. depth or width) is being transmitted via FD.

FD=Form Depth data is transmitted over this line in serial RS 232 or similar serial format DM="low" means dumb master is on line and controlling PULSE line signals.

PLOCK and FDLOCK may not be simultaneously active (i.e. "low")

PULSE may not be "low" if PLOCK is not "low"

FD may not be "low" if FDLOCK is not "low".

The main servo board 128 (FIG. 12) and the tractor servo board 138 (FIG. 13) may be substantially the same insofar as the hardware is concerned. For example, in the exemplary embodiment, the only hardware distinction between these two circuits may be the jumper connection 1200 (connecting both the first and second clock inputs of counter-circuit 1202 to a 2 Mhz clock in FIG. 12 and jumper 1201 connecting one of the countercircuit inputs to the second output of a quadrature steering logic circuit 1204 instead in FIG. 13). However, as will be observed by the identified line designations, the inputs/outputs ports for the main servo board 128 are connected somewhat differently than for the tractor servo board 138 (e.g. so as to effect their respective functions as depicted in FIG. 11. The EPROMs on the two boards are, of course, also loaded with different "software" appropriate to their different functions.

In both servo boards, the heart of the system is a microprocessor 1210 (e.g. an INTEL 8088 processor). A conventional memory decoder 1212 (e.g. integrated circuit type 138) may be utilized to interface with battery backed RAM 1214 (e.g. intergrated circuit type MK48Z02-20) in which relatively permanent data such as operating parameters and the like may be stored in nonvolatile form. Conventional erasable programmable read only memory EPROM 1216 (e.g. integrated circuit type 2764) may be provided for storage of the controlling computer program ("software"), including velocity profile data and the like. The memory decoder 1212 may also be used to access the status of a conventional interrupt controller 1218 (e.g. integrated circuit type 8259A). Conventional address bus 1220, address/data bus 1222 and control bus 1224 are also provided for the purpose of conventional intercommunication between these digital circuits. Also connected to such bus lines is a conventional counter/timer circuit 1202 comprising three 16 bit counter/timers (e.g. integrated circuit type 8254A).

In the main servo board 128, counter $\phi$ and counter 1 are both clocked by a fixed rate 2 MHz clock pulse or the like and circuit 1202 may be used (under program control of microprocessor 1210) to cause output No. 1 to produce bus drive process pulses BDPULSE (e.g. if the programmed microprocessor 1210 determines that it has initiated the process and thus that it should become the "master" process pulse driver for the inter-module bus line).

The servo boards 128, 138 further include conventional address latches 1226 (e.g. integrated circuit type 373) and buffer circuit 1228 (e.g. IC type 244) so as to drive a buffered output bus line 230 which may be used to drive conventional output port registers 1232 (to provide digital input to the digital to analog converters 129, 139) and other digital output to the watchdog doctor board 1110, the inter-module umbilical bus 134, etc. (IC type 374 may be utilized for the output port display registers). Similarly, input ports 1236 (e.g. IC type 244) are provided so as to per;:it the microprocessor-based system to read data on the operator control console 132, from the inter-module umbilical bus 134, the transverse encoder 1108, etc. I-O decoder 1238 (e.g. IC type 138) may also be utilized so as to selectively access and control the output and input ports 1232, 1234, and 1236 as will be apparent to those in the art.

The rotary encoder outputs typically include two different phases of substantially square wave signals or pulses with one phase leading the other by 90 degrees. A relative direction of rotation determines which phase is leading at any given time. In addition, such encoders typically provide an index or marker pulse once per revolution. Quadrature steering logic 1240 and 1242 is utilized to process these raw encoder output signals so as to determine the direction of rotation and relative position/velocity thereof. Such quadrature steering logic, may, for example, comprise a dual one-shot timer circuit (e.g. IC type 221) together with a pair of NAND gates so as to develop a train of pulses on "forward" output line when the encoder is moving in one direction or a similar train of pulses on the other "reverse" output line if the encoder is rotating in the opposite direction.

Figure 12:
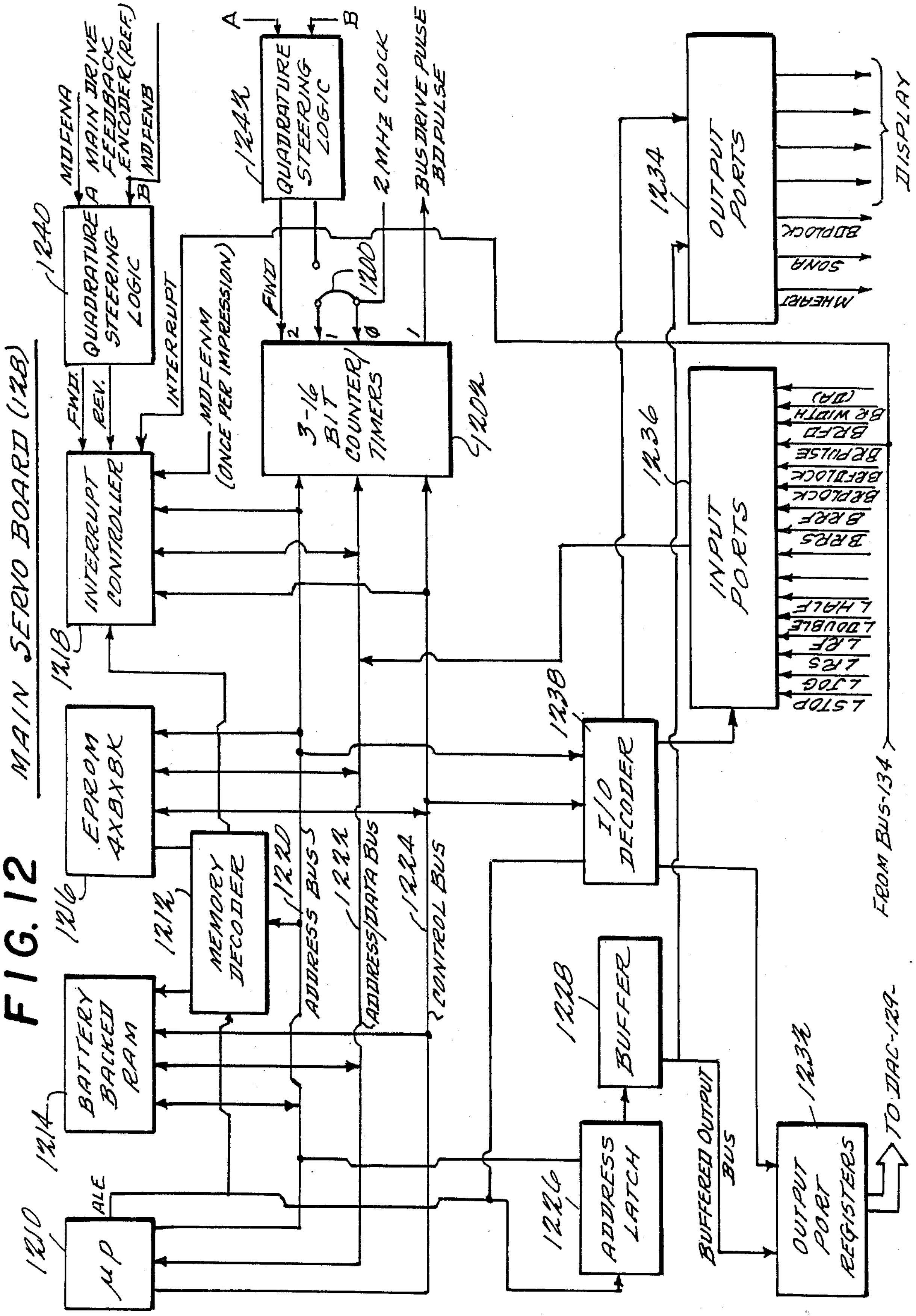
FIG. 12 is a more detailed circuit diagram of the microprocessor-based main servo subsystem of FIG. 11.
Figure 13:
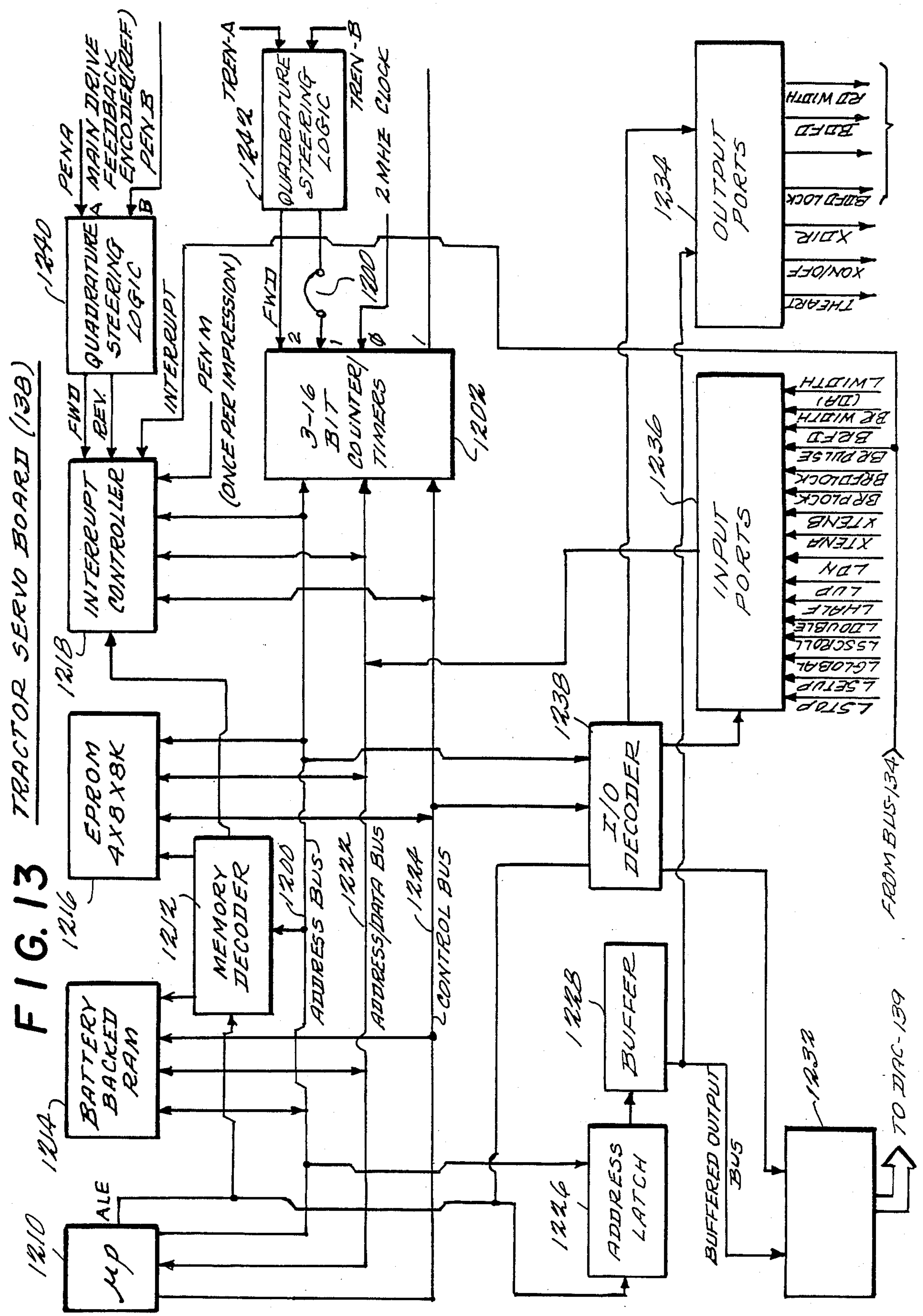
FIG. 13 is a more detailed circuit diagram of the microprocessor-based tractor servo subsystem of FIG. 11.

As depicted in the FIGS. 12 and 13, whenever the PULSE line on bus 134 has a pulse occurrence, the interrupt controller 1218 is triggered and a microprocessor subroutine is then entered to effect the proper velocity/position feedback servo control. For example, in the main servo board 128, the microprocessor will check to ensure that an expected main drive feedback encoder signal occurs at approximately the same time. If not, then the digital output to DAC 129 will be increased or decreased as appropriate to control the speed of the main process drive motor and keep it in synchronism with the pulses appearing on the inter module bus line 134. In the tractor servo board 138, the same kind of an interrupt will cause a similar microprocessor-based control function which checks to see if the expected number of tractor rotational encoder pulses correspond to the number desired by the next entry in the stored velocity/displacement profile data then being used to control the relationship between web drive and process drive. If not, then a suitable increase or decrease in the "raw" value of the digital output to DAC 139 will be generated under microprocessor control to cause an appropriate increase or decrease in the speed of tractor drive motor 124.

The watchdog doctor board 1110 is shown in more detail at FIG. 14. The missing pulse detector circuits 1400 and 1402 each comprise a pair of one-shot circuits set to time out at approximately 100 milliseconds or so (in the exemplary embodiment). One of the one-shots is reset for each detected positive-going transition of a heartbeat signal while the other one shot is reset for a detected negative-going transition of a heartbeat signal while the other one shot is reset for a detected negative-going transition. If there is more than 100 milliseconds between successive positive or negative-going transitions, then one or more of the one shots will time out and remove an input from NAND gate 1404 thus causing its output to transition and reset flip-flop 1406 (which has previously been set when the module was turned on to supply the +5 volt supply to the RC filtering circuit so as to provide a slow power on clearing or setting (e.g. slower than POC on the servo boards). Thus, NAND gate 1410 will transition to turn off the LED health indicator 1112 which, in the normal or health state, would be "on" to emit light. The same non-healthy condition may also be utilized so as to remove a bus enable signal as indicated in FIG. 14 (if desired) and to disable all drives—this is a "catastophic" failure.

An exemplary embodiment for the intermodule stop circuitry is shown in FIG. 15. Here, the "stop" circuit for the umbilical inter-module bus 134 is schematically depicted. As seen in FIG. 15 and as earlier mentioned, the input side of each module 100, 100' has three bus plugs 142 while the output side has a single umbilical output cable with an appropriate plug 140 connected to a 24 volt circuit. As will be seen the "health" relay contacts (closed only when a "healthy" condition is present) and a "stop" switch 202*b* (normally closed but may be manually actuated to open same) are each connected in series via the various sockets 142, plugs 140 and dummy plugs 140'. If any one of the modules creates an open circuit in this series line (i.e. if any one of the stop keys is depressed or any one of the health relays deactuated), then the 24 volt supply to the stop relay coils in each module will be interrupted thus opening the stop relay coil contacts. The stop relay contacts are connected via the LSTOP line to the main and tractor servo loop microprocessors which are then programmed to detect such a stop condition and, in response, to stop driving the motion control motors and the like.

When modules are connected together, all stop, run/-safe buttons, dummy plugs, umbilical cords, and health relays are wired together in a series circuit. The ONE module which does not have its umbilical cord connected to another module must have its umbilical cord plugged into a special socket provided at the outfeed end of the module. This special socket allows the last module to supply the +24 volts required for the stop circuit interlock. Modules may only plug from the front (outfeed) of one module to the back (infeed) sockets of another, or into "themselves" (the special connector at the outfeed end). By plugging the cord of a module into its own special socket, the output of the series run circuit is connected to the bus signal line which pulls all stop relays closed in parallel (see FIG. 15).

As shown in FIG. 16, essentially the same electrical drive/control architecture may be utilized when the main process is a web folding process albeit, in this instance, there would typically be only a single tractor sprocket drive assembly Here, the process requires a substantially "flat" velocity profile. Accordingly, the velocity profile would be programmed to follow the average web throughput of any upstream modules. For example, the main process drive (the folding mechanism) may remain synchronized to the inner module bus process drive signals (e.g. 102 pulses or tics per form) while the web drive inputs the proper amount of paper per cycle of folding operation. The same arrangement may also handle multiple web products due to the use of a tractor based web transport.

A possible "infeed" geometry for a module is depicted at FIG. 17. This arrangement may be used to controllably unwind or infeed web material from a commercially available roll stand mechanism. Here, once again, the process may utilize a "flat" velocity/-web displacement profile. In this instance, the flat profile may be calibrated so as to follow the average web throughput required to feed downstream modules performing subsequent web processing functions. The web drive controller may be adapted to receive its motion reference input directly from the intermodule bus (as shown) and used to supply the needed web throughput while maintaining a desired slack loop of web (e.g. as measured by a sonic sensor input). A cross-machine line hole punch unit may be driven in common with the outfeed from this module. The main process control microprocessor may still provide an operator interface with the intermodule bus—but does not, in this particular instance, drive any process. Such an infeed process module may handle virgin mill rolls (unpunched), preprinted-prepunched rolls, or a tight web type of infeed by altering the webbing/element motion as should now be understood by those in the art.

For comparison purposes, a geometry diagram is given in FIG. 18 (similar in organization to the format of FIG. 16) for a numbering, diecut, imprinting, etc. process module similar to that already depicted in FIG. 1. In FIG. 19, a schematic geometry diagram is shown for perforation/cutoff web processes. Here either a typical (i.e. variable) or a "flat" velocity profile may be utilized for cutoff functions while changing velocity profiles are used for perforations (e.g. which may occur at various places on a given form between regular cutoff locations). Any web trim may also be slit off during the cutoff operation as will be understood by those in the art.

Figure 20:
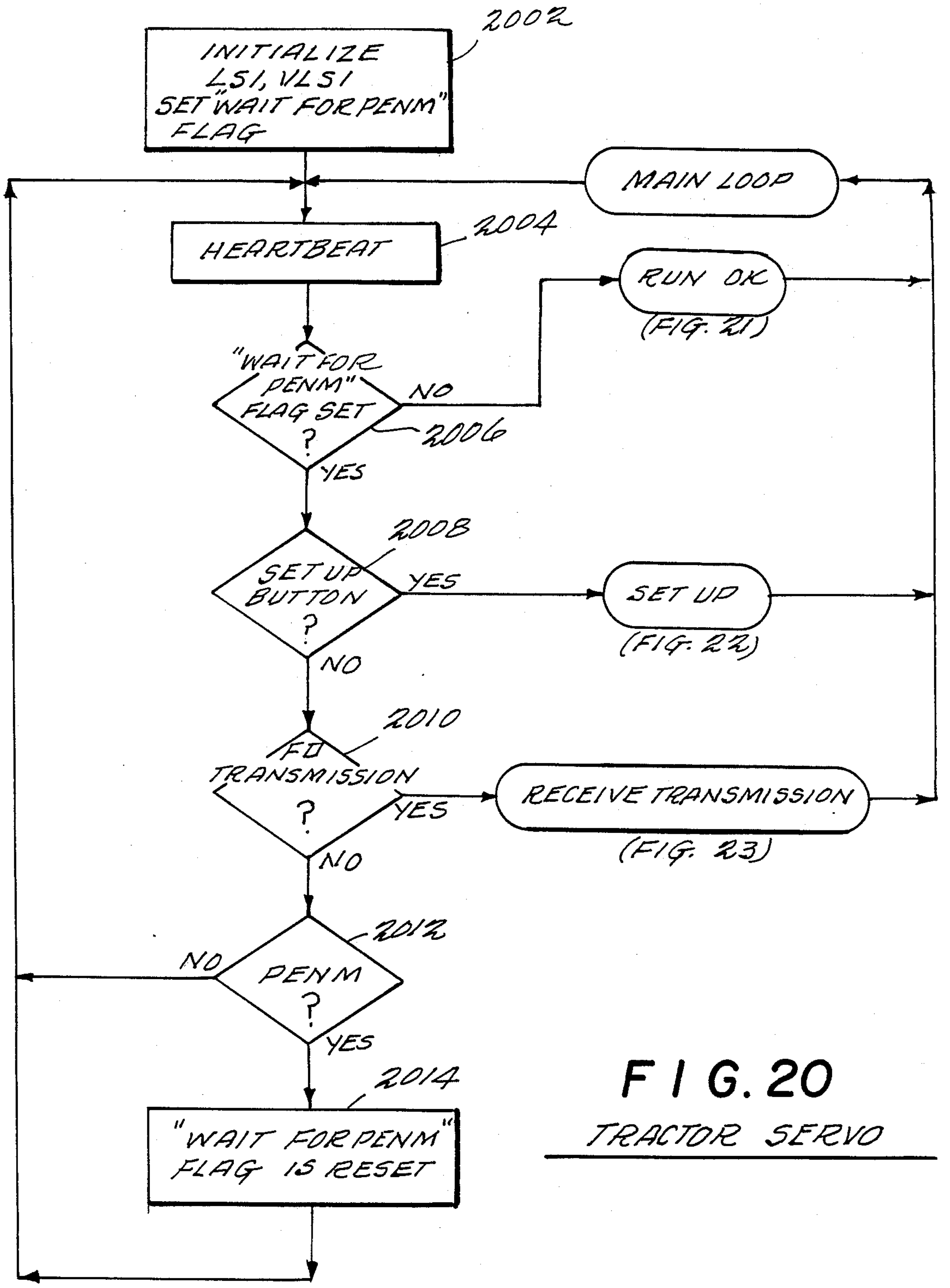
FIGS. 20–24 are simplified flow charts of suitable computer programs for the tractor servo microprocessor-based subsystem of FIG. 11.

An exemplary embodiment of computer program "software" for the tractor servo circuit 138 is depicted at FIGS. 20–24. The main control loop is depicted at FIG. 20 and various subroutines at FIGS. 21–24. Upon entry, conventional housekeeping initialization functions are performed at block 2002 (including setting a "wait for PENM" flag) and a THEART output signal is generated at heartbeat function 2004 before a wait loop at 2006 is entered looking for a process encoder marker pulse (by testing the status of the "wait for PENM" flag). If such a pulse is not found to be present, then control is passed to the RUN OK sub-routine of FIG. 21. If such flag is detected to be set, then control is passed to decision point 2008 where the status of "set up" 204A is tested. If the button is depressed, then control is transferred to the set up sub-routine of FIG. 22. If not, then control is passed to decision point 2010 where a check is made to see if form dimension transmissions are occurring. If so, then control is passed to a RECEIVE TRANSMISSION sub-routine at FIG. 23. If not, then control is further passed to decision point 2012 where a test is made for the presence of signal PENM. If it is now found to be present, then control is passed to block 2014 where the "wait for PENM" flag is reset and control is then passed back to decision point 2004 where the status of that flag is tested. If the PENM signal is not found to be present at step 2012, then control will also be passed back to step 2004 where, if the wait for PENM flag is not longer set, control will be passed over to the RUN OK program of FIG. 21, etc. As will be seen, all of the sub-routines return to the "main loop" control as shown in FIG. 20.

Figure 21:
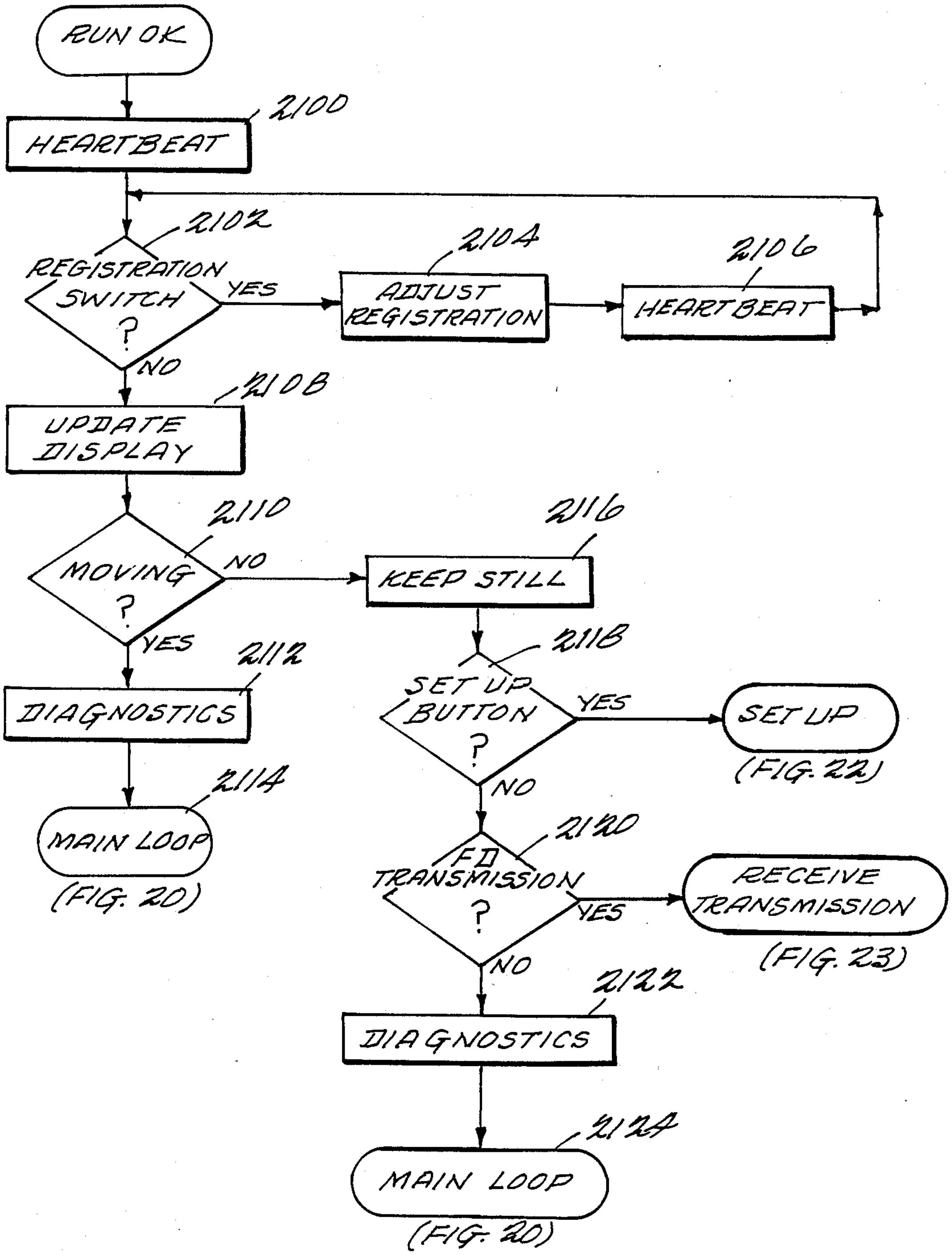

The RUN OK program subroutine shown in FIG. 21 first generates another heartbeat signal at 2100 before control is passed to test 2102 for the status of the registration switch. If the registration switch has been set, then an appropriate registration adjustment is made at 2104 so as to advance or retard the process of fetching stored web velocity/displacement profile data thus adjusting the relative registration between the process drive and the web drive. Another heartbeat pulse is generated at 2106 (and others may have been generated during the registration routine) before control is returned back to the registration switch test point 2102. If the registration switch flag has not been set (e.g. the advance/retard switch 204E is not activated during a running condition), then the form dimension display **204*f* is updated at step 2108 before a test is made at 2110 to see whether the web is still moving or not (e.g. are output pulses from the tractor encoder 136 still occurring) if so, then routine housekeeping diagnostic may be performed at step 2112 before control is passed back to the main loop at 2114. On the other hand, if the web is detected as not yet moving, then drive to the web drive motors may be stopped at step 2116 and a test made at 2118 to see if the setup button 204*a* has been depressed. If so, then control is transferred to the setup routine of FIG. 22. If not, then a test is made at 2120 to see if form dimension data is being transmitted. If so, then control is passed to the receive transmission subroutine of FIG. 23. If not, then control may be passed to any desired conventional housekeeping diagnostic type of processes at 2122 before ultimately being passed on to the main loop at 2124**.

Figure 22:
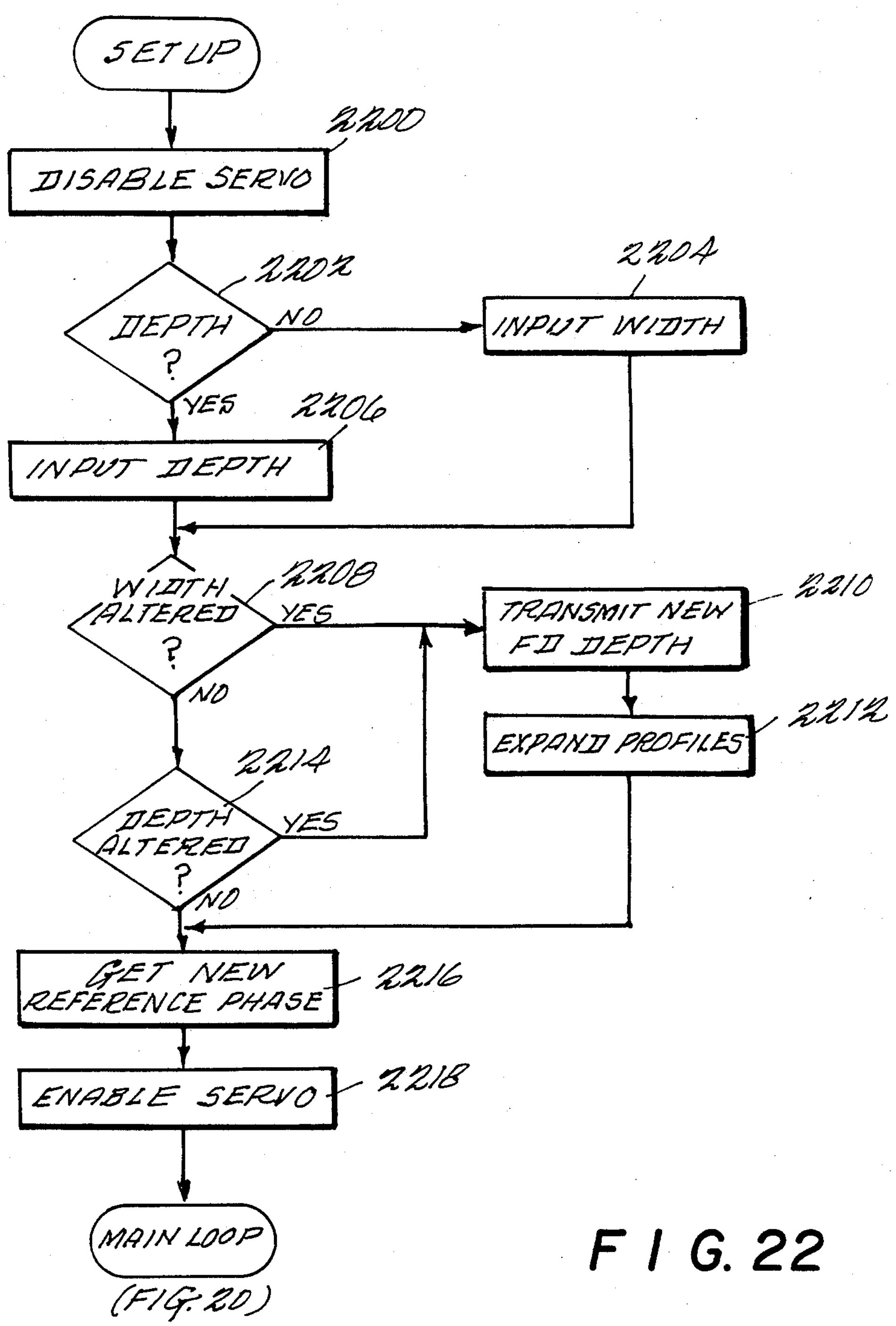

When the set up subroutine of FIG. 22 is first entered, the tractor servo motor 124 is disabled at step 2200 (thus permitting manual adjustment of the tractors). Thereafter, a test is made at 2202 to see if the form depth switch **204*d* is in the depth position. If not, then control is transferred to input width data at 2204. If the switch 204*d* is in the depth position, then control is transferred to 2206 so as to permit form depth data to be input. Once the width or depth data has been entered, then control is passed to test point 2208 to see if the width dimension has been altered. If so, then control is passed to block 2210 and the new forms dimension data is then transferred whenever the setup switch 204*a* is released and appropriate web velocity/displacement profiles are fetched at 2212 and expanded into a working RAM table (if stored in "condensed" format) so as to be ready for immediate usage. If the width data has not been altered, then control is passed to 2214 to see if the depth data has been altered. If so, then control is again returned to step 2210 where the new forms dimension data is transmitted upon release of the setup button, appropriate velocity profile data is fetched and expanded, if necessary, etc. A wait is then made at 2216 for a new reference phase marker from the process drive whereupon the web drive servo motor is again enabled at 2218 and control is passed back to the main loop of FIG. 20**.

Figure 23:
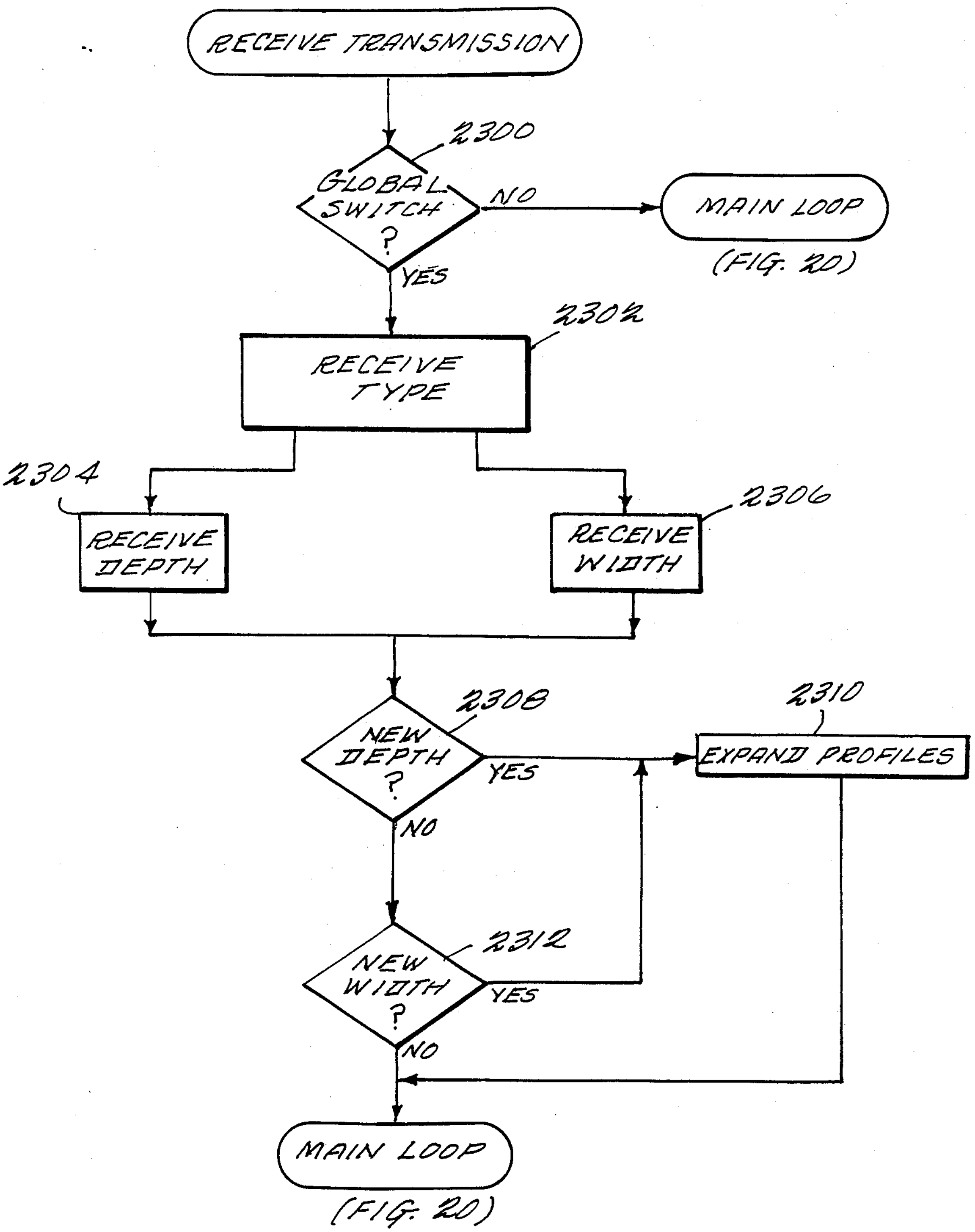

Upon entry into the receive transmission subroutine of FIG. 23, a test is made at 2300 for the position of the local/global switch **204*c*. If it is not found to be in the global position, then control is immediately returned to the main loop of FIG. 20. However, if the switch is found to be in the global position, then control is passed to 2302 where a test is made to determine whether depth or width data is to be received and control is transferred to the appropriate serial data receiving algorithm 2304 (for depth) or 2306 (for width). Thereafter, a test is made at 2308 to see if new depth data has been received. If so, then control is passed step 2310 where appropriate velocity profile data is expanded (if stored in compressed format). If new depth data has not been received, then a test is made at 2312 to see if new width data has been received. If so, then control is again passed to block 2310 where expanded profile data is generated so as in readiness for use and control is, in any event, then returned to the main loop of FIG. 20**.

It will be generally understood that many additional heartbeat generation steps may be embodied within all of the subroutines so as to ensure that a heartbeat is generated at intervals less then 100 milliseconds if normal program control is occurring.

Figure 24:
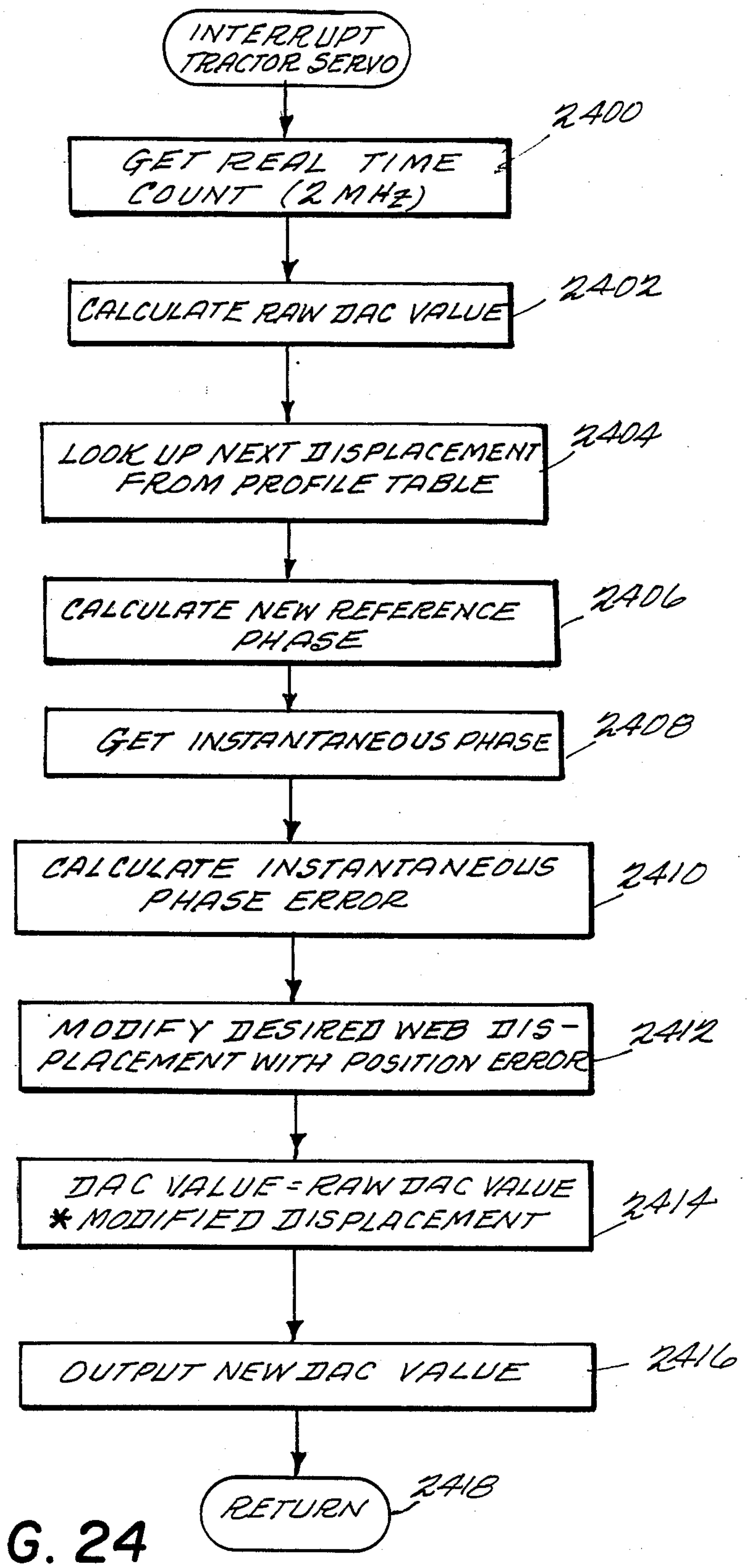

The interrupt routine of FIG. 24 is entered any time a main drive feedback encoder output is generated representing an additional sensed 1/12th increment inch of main process displacement. Here, a real time calculation is immediately performed so as to generate an appropriate DAC output signal to drive the servo tractor drive motor 124. At block 2400, a realtime clock count is fetched from one of the 16 bit counter/timers 1202 (comparison with the last reading provides a measurement of the time required to achieve the current sensed increment of displacement). A raw or nominal value for the DAC input signal is calculated at 2402 and then the next desired displacement increment for the web is looked up from the expanded velocity profile table of data at 2404. A new reference phase is calculated at 2406 and the instantaneous actual phase of web motion is read at 2408 so as to enable the instantaneous phase error to be calculated at 2410. The desired web displacement value is then modified with the detected position error at 2412 and the actual required DAC value is then calculated at 2414 and output to control DAC 139 at step 2416 before control is returned at 2418 to whatever process has been interrupted.

Figure 25:
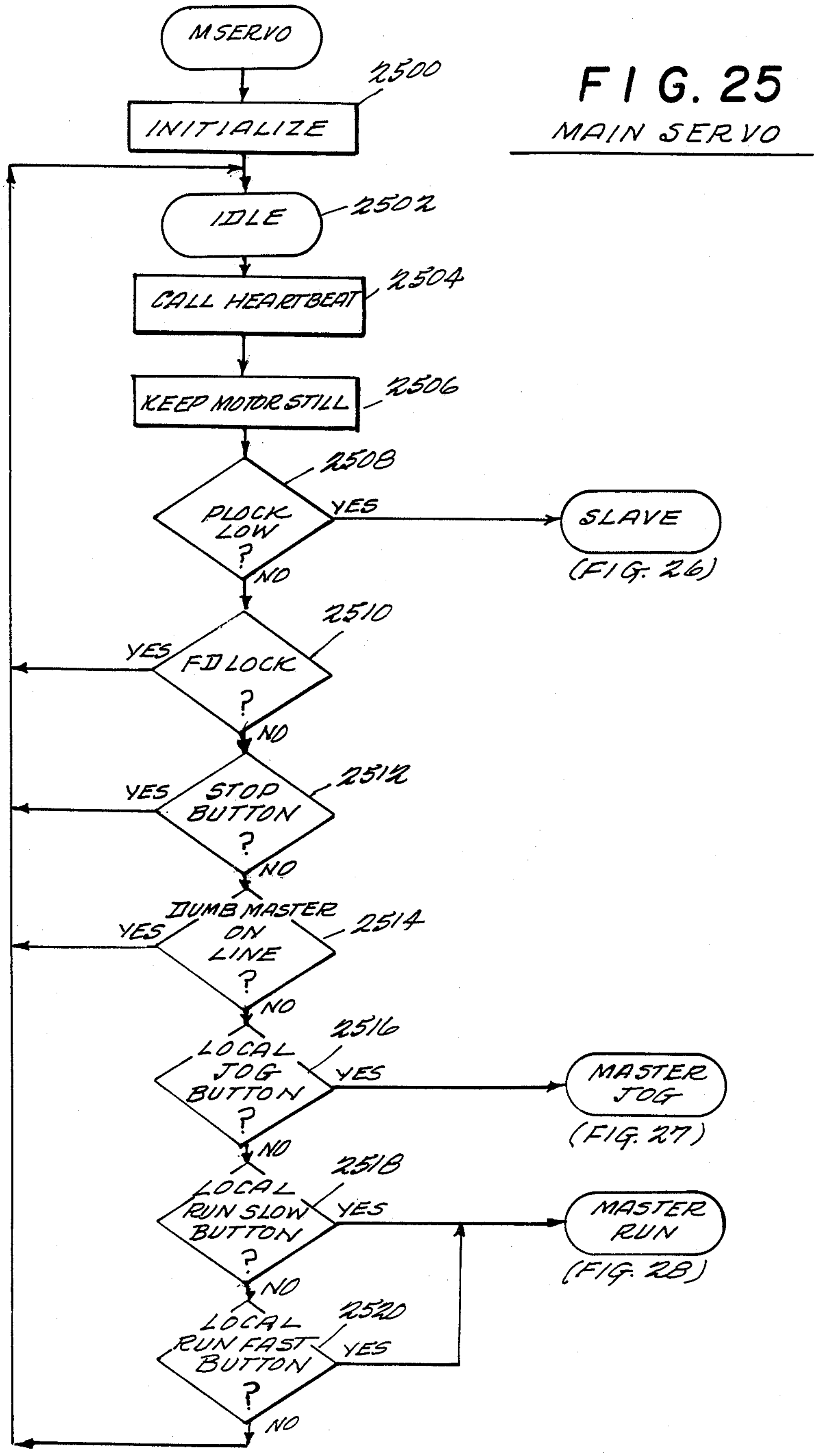

The main servo control program loop is depicted at FIG. 25 where, after conventional initialization at 2500, control is passed to an "idle" loop comprising the rest of FIG. 25. (It should be noted that a process pulse signal on the inter-module bus will interrupt the main servo system and cause conventional calculation of error corrected DAC output in the main servo speed control loop.) Once the idle loop 2502 has been entered, a heartbeat generator routine may be called at 2504 (e.g. so as to generate an MHEART signal for the watchdog health indicator circuit). At step 2506, steps are taken to ensure that the process drive motor remains at rest before test is made at 2508 to see if a PLOCK signal is present on the inter module bus. If so, then control is passed to the slave subroutine of FIG. 26. If not, then a test is made at 2510 to see if the forms dimension lock is present on the inter module bus. If so, then control is returned to the idle subroutine 2502. If not, then a test is made at 2512 for the status of the stop button 202*b*. If the stop button has been depressed, then return is also made to the idle subroutine 2502. If not, then a test is made at 2514 for the possible presence of a dumb master on the inter-module bus line. If such a dumb master is present, then control is again passed to the idle subroutine whereas, if not, control is passed at test point 2516 where a test is made for activation of the local JOG switch 202*c*. If the JOG button has been activated, then control is passed to the master jog subroutine of FIG. 27. If not, then control is passed at test point 2518 where the status of the local run slow button 202*d*is tested. If depressed, then control is passed to the master run subroutine of FIG. 28. If not, then a similar test is made for the run fast button 202*e* at step 2520 with control again being passed to the master run subroutine of FIG. 28 if this button has been activated and, if not, back to the idle subroutine 2502.

Once entry is made to the slave subroutine of FIG. 26, then a test is immediately made at 2600 for the presence of a dumb master on line. If not, then a brief sound alert is activated at 2602 and control is passed to a heartbeat generating routine 2604 before a test is made at 2606 for the presence of PLOCK. Since entry to the slave subroutine was made only because such a signal was detected as being present, any loss of the signal will result in control being passed back to the idle subroutine of FIG. 25. If PLOCK is still present (indicating a run mode), then conventional housekeeping diagnostics may be performed at 2608 before control is looped back through the heartbeat step 2604 and the test for PLOCK at 2606.

If the master jog subroutine of FIG. 27 is entered, then the PLOCK signal is generated for the intermodule bus drive at 2700 and a brief sound alert is initiated at 2702 before a heartbeat is generated at 2704 and a test is made at 2706 for the status of the stop button 202*b*. If the stop button is depressed, then the PLOCK bus line is released at 2708 and control is passed back to the idle subroutine of FIG. 25. On the other hand, if the stop button has not been depressed, then a test is made for the status of the JOG button at 2710. If it is not still activated, then the PLOCK busline is again released at 2708 and return is made to the idle subroutine of FIG. 25. On the other hand, if the jog button is still depressed, then process drive pulses will be issued at 2712 to the intermodule bus line (in accordance with a desired function generator subroutine not shown) and control may then be passed to perform any desired housekeeping diagnostic at 2714 before a loop is made back the the heartbeat generator 2704, etc. as depicted in FIG. 27.

Figure 28:
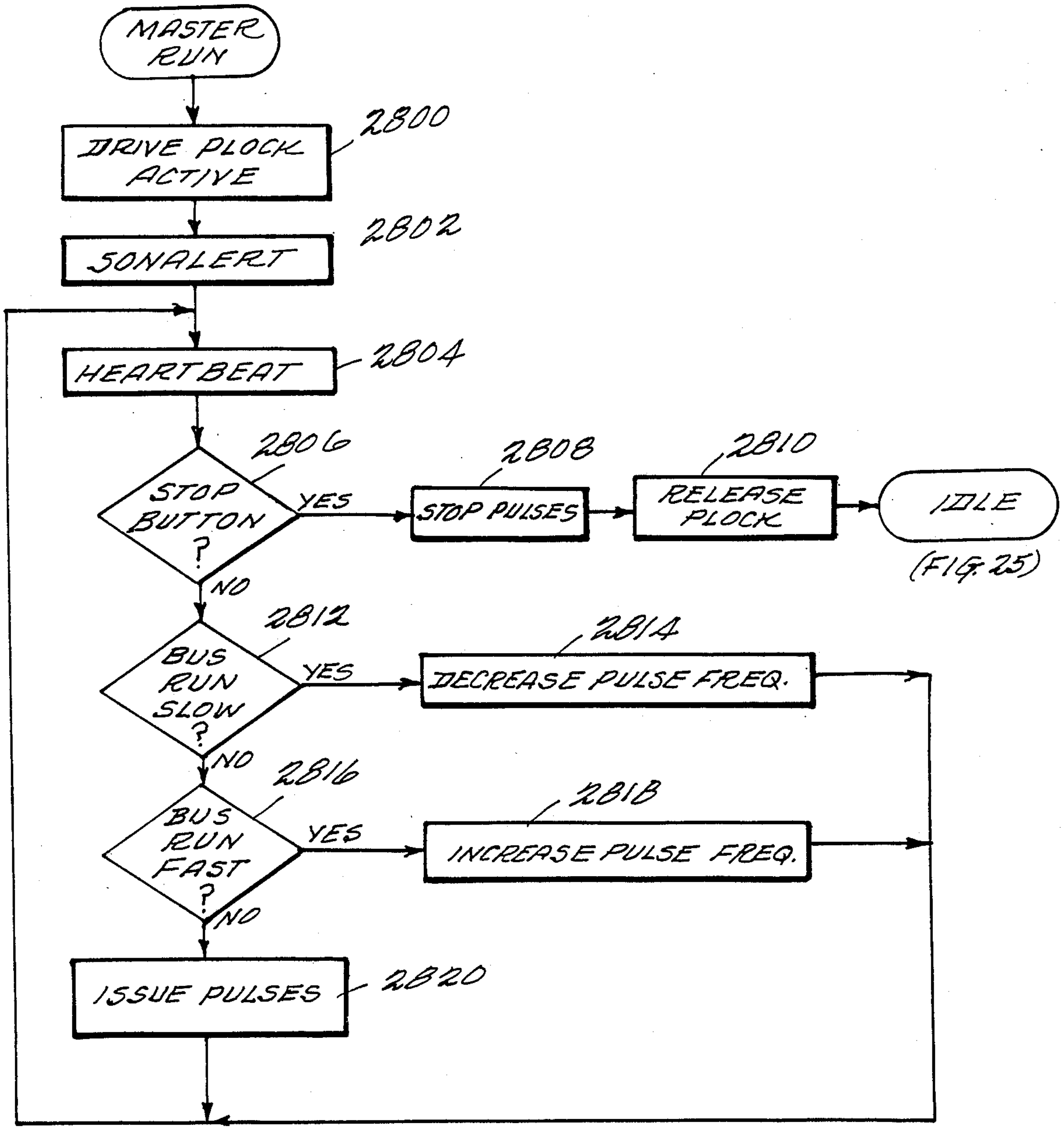

If the master run subroutine of FIG. 28 is entered then the PLOCK bus line is again taken over and driven at 2800 and a brief sound alert is initiated at 2802 before a heartbeat signal is generated at 2804 and the status of the stop button is tested at 2806. If the stop button has been depressed, then process drive pulses will be stopped at 2808, the PLOCK bus line will be released at 2810 and control will be passed back to the idle subroutine of FIG. 25. If the stop button has not been depressed, then a test will be made for a bus run slow signal at 2812 and, if present, then the process drive pulse frequency will be decreased (e.g. to 28 impressions per minute) at 2814 before control is looped back to heartbeat generation 2804. On the other hand, if there is no bus run slow signal present, then a test is made at 2816 for a bus run fast signal. If present, the process drive pulse frequency on the bus line is increased at 2818 (i.e. by some predetermined increment which, so long as the bus run fast key is retained in the depressed condition, will be repetitively incremented each time this portion of the loop is traversed via decision point 2816). Control is then passed from block 2818 back to the heartbeat generator 2804. If the bus run fast switch is not depressed, then process drive pulses at the regular rate will be issued at step 2820 before control is again passed back the heartbeat generator 2804.

Figure 29:
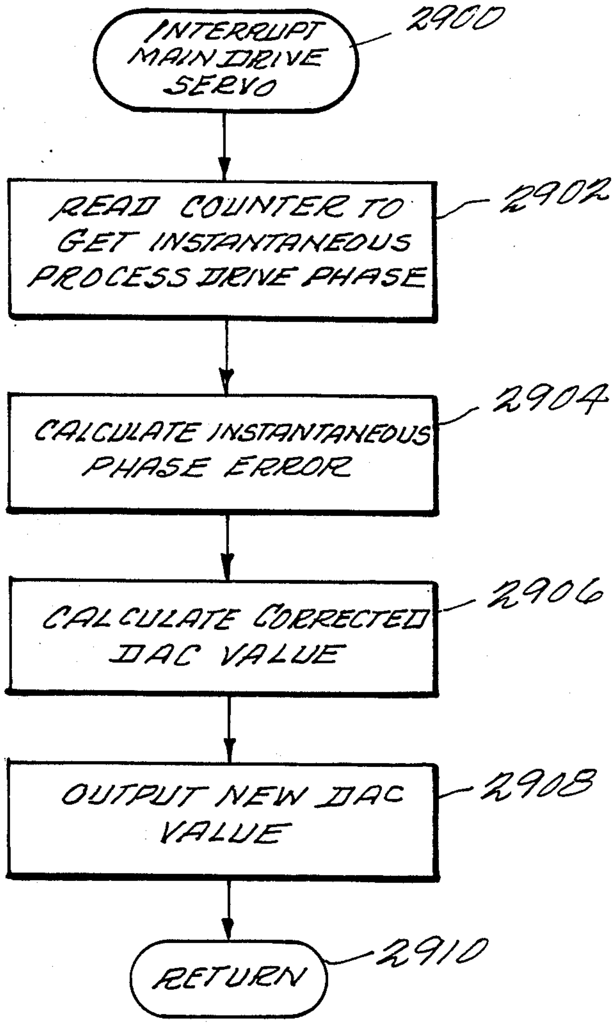

The interrupt tractor drive control has already been explained with reference to FIG. 24. In addition, each time a process drive pulse occurs on the intermodule bus (which may have been generated by the main drive servo board of the module in question if it initiated the process motion), the main drive servo processor board 128 is also interrupted with control being passed to an interrupt routine as shown in FIG. 29. Here, upon entry at 2900, the current instantaneous position of the actual process drive is observed at 2902. If the drive is properly synchronous, one process encoder pulse (representing 1/12 inch of process drive) should occur for each process drive pulse occurring on the intermodule bus. If the expected 1:1 ratio is not occurring, the instantaneous phase error is calculated at 2904 and a corrected DAC drive value is calculated at 2906 and output at 2908 to DAC 129. A normal exit from the interrupt routine is taken at 2910.

The bus arbitration algorithm is built into the flow charts of FIGS. 25-28. In the idle mode of FIG. 25, the status of PLOCK is constantly monitored. If it ever goes "low", then exit is taken to the SLAVE routine of FIG. 26 where it stays while PLOCK is low—thus precluding it from becoming the master source of process drive pulses to the intermodule bus. On the other hand, if any of the operator switches requesting process motion is depressed on a given module (i.e. local jog, local run slow or local run fast), then the idle loop is exited to either the MASTER JOG (FIG. 27) or the MASTER RUN (FIG. 28) routines. Either of these routines will cause this particular module to drive PLOCK to its "low" or "active" status (thus locking out all other modules) and will also cause this particular module to issue process drive pulses to the intermodule bus until the STOP button in any module is depressed whereupon PLOCK is released and the idle loop of FIG. 25 is re-entered.

It may be useful to think of the module as being in one of three "modes" at any given time. These modes will be discussed individually because the function of some of the controls changes depending on the present "mode" of the module.

(1) The Wait-For-Process Mode. When the module is turned on, a "HI" is displayed in the FORM DIMENSION display. This friendly greeting means that all is well and the tractors are waiting for the first contact indicated by PENM of the process so they "know" where the process is.

In this mode the tractors are free and may be positioned by hand (unless, of course, the process is stopped on top of the web, preventing the tractors from moving).

Any time a form dimension is altered or a module is turned on, the module will automatically go into the wait-for-process mode and display "HI".

The SETUP button can move the module into (2) The Setup Mode. Whenever the SETUP button is pushed, the module enters the Setup mode unless the process is actually moving.

The module remains in the Setup mode only as long as the SETUP button is pushed.

Whenever the module enters the Setup mode, the DEPTH/WIDTH switch determines whether the display shows form depth or form width.

If the DEPTH/WIDTH switch is in the Width position, then present form width is displayed. Form width may be adjusted by pointing the lever of the UP/ADVANCE/DOWN/RETARD switch either Up or Down. The display will change in fractional steps. When the display reaches the desired width, release the UP/ADVANCE/DOWN/RETARD switch. If the form depth is also to be adjusted, the DEPTH/WIDTH switch may be changed. If only the width is to be adjusted, the SETUP button may be released. When the SETUP button is released and the tractors will automatically move to their new position, and the module will enter the Wait-For-Process mode, displaying "HI".

If Depth is chosen by the DEPTH/WIDTH switch, up to four form depths can be run, one right after another. These form depths are altered in the Setup mode by pushing the SCROLL button.

When the SETUP button is pushed, the dimension which is displayed is the first form depth. This form depth may be adjusted by moving the UP/ADVANCE/DOWN/RETARD lever. Pushing the SCROLL button down and releasing it displays the SECOND form depth. If this is an "E" (for Empty), this means there is no form depth in this "slot" and the module will only repeat the first form depth. The SCROLL button will select the four form depth "slots", allowing one to examine and adjust them. Note that the first "slot" is slightly different than the other three in that it only goes to "O" and can never be "E", or Empty.

All this must take place while the operator is holding down the SETUP button.

If any of the form dimensions (depth or width) have been changed, then the module will automatically enter the Wait-For-Process mode when the SETUP button is released. If nothing has been altered, then the module will go into the mode it was in when the SETUP button was pushed, which was either the Wait-For-Process mode or (3) The Run Mode. The Run mode is the mode the module will be in the most. The run mode does not necessarily mean the module is actually running, but it does mean that the module has been running and is ready to run some more, or it is actually running.

While the module is in the Run mode the tractors are under control of the drive motor and one cannot move them by hand.

When the module is in the Run mode, the only control in the Tractor Control section 204 having any effect on the operation of the module is the UP/ADVANCE/DOWN/RETARD switch (and SCROLL controls coarse registration). In the Run mode, this switch is used to adjust the registration of the main process to the paper. When this lever points to the Advance position, the paper is slowly moved back in steps of 0.002 inch, causing the process function to advance on the form. The amount of adjustment which takes place is displayed in thousandths of an inch in the display. For example, to advance a number on the form 1/32 inch, one may point the lever of the UP/ADVANCE/DOWN/RETARD switch to the Advance position and release it when the display reaches 30.

Of course, this adjustment also can be made "on the fly" while running.

While only a few exemplary embodiments of this invention have been described in detail, those ordinarily skilled in the art will appreciate that many modifications and variations may be made in these exemplary embodiments while yet retaining many of the novel features and advantages of this invention. Accordingly, all such modifications and variations are intended to be included within the scope of the appended claims.

What is claimed is:

1. A web processing module comprising:

web processing means for effecting a predetermined web process;

web driving means for transporting a web relative to said web processing means; and electrically programmable web drive control means connected to the drive means to control the web motion by control of the drive means in accordance with a program that enables variation in web movement between successive process operations to alter the distances between successive process operations.

2. A web processing module as in claim 1 wherein said web processing means is periodically in physical contact with said web at a predetermined velocity and wherein said web drive control means operates to drive the web at a velocity matching that of the process during the times of physical contact therewith.

3. A web processing module as in claim 2 wherein said web drive control means is capable of effecting a plurality of different web movements between successive process contact times thus producing a plurality of successive different form lengths.

4. A plurality of web processing modules, each module comprising a web processing means for effecting a predetermined web process; web driving means for transporting a web relative to said web processing means; and electrically programmable web drive control means connected to the drive means to control the web motion by control of the drive means in accordance with a programmable function of the process, means electrically interconnected and physically arrayed together to effect a coordinated web finishing process, each module effecting a different process but having substantially the same average web throughout, there being a slack loop of web disposed between adjacent modules in the array.

5. A web processing module comprising:

web processing means for repetitively effecting a predetermined web process;

web driving means for transporting a web relative to said web processing means;

electrically programmable web drive control means connected to control the web motion by control of the drive means in accordance with pre-stored velocity/position profile digital data representing a predetermined but programmable functional relationship between process motion and web motion to enable alteration of the distances between successive processing operations.

6. A web processing module as in claim 5 wherein said web drive control means comprise:

a process drive encoder means for producing a first electrical pulse $P_1$ in response to a predetermined first increment 1/N of process drive motion and at least one marker reference pulse $P_m$ occurring at a predetermined phase of each repetition of said web process;

a web drive encoder means for producing a second electrical pulse $P_2$ in response to a predetermined second increment 1/M of driven web motion;

digital memory means for storing said profile digital data as a sequence of digital signal values corresponding to the programmed number of web drive encoder pulses $P_2$ which are to occur for each successive occurrence of a process drive encoder pulse $P_1$;

a web drive servo control loop means which uses said marker reference pulse $P_m$ as a web drive registration reference signal, which uses said web drive pulses $p_2$ as a feedback servo control signal and which utilizes successive ones of said profile data to derive a corrected and programmably controlled web drive output signal.

7. A web processing module as in claim 6 wherein means are provided to pre-store a plurality of sets of said profile digital data in compressed form using digital data signals representing: (a) form length, (b) length of required process/web speed matching, (c) overall process repeat length and (d) one-half of a symmetrical web drive speed change.

8. A web processing module comprising:

an electrical intermodule umbilical bus adapted to electrically interconnect with other web processing modules;

a web driving electrical motor;

a web drive rotational encoder producing first output electrical signals representing increments of actual web drive motion;

a process driving electrical motor driving a repetitive web process;

a process drive rotational encoder producing second output electrical signals representing increments of actual process drive motion and also producing at least one marker reference signal at a predetermined phase of each repetition of said web process;

a web drive servo control loop connected to use said first output electrical signals as a web drive motion feedback signal and said marker reference signal as a registration control motion index or reference signal for effecting registration control between said process driving and said web driving motors;

said web drive servo control loop also using said second output electrical signals in conjunction with programmable velocity/position profile data to achieve overall programmable control of a predetermined functional relationship between said process driving and said web driving motors to control the relative motion between the web and process drives accordingly; and a main process drive servo control loop connected to use said second output electrical signals as a process motion feedback signal and to use reference process drive signals obtained from said intermodule bus for maintaining the motion of said process driving motor in synchronism with said reference process drive signals.

9. A free-standing mobile web processing module comprising:

an intermodule electrical bus adapted for electrical connection to other modules;

a process drive servo control loop electrically connected with said bus and adapted to drive a web process in synchronism with electrical process drive control signals appearing on said bus; and a web drive servo control loop electrically connected with said process drive servo control loop and adapted to drive a web in synchronism and in a predetermined relationship with respect to said driven web process.

10. A web processing module as in claim 9 further comprising:

operator means coupled to said process drive servo control loop for initiating process drive motion when actuated; and means for supplying said process drive control signals to said bus if process drive motion is initiated by the operator means.

11. A web processing module as in claim 10 wherein said bus includes:

a serial stop interlock circuit;

at least one output umbilical cord with an electrical connector at its distal end for connection with another module;

a plurality of input electrical connectors for receiving the distal end of the umbilical cord from other modules; and at least one further electrical connector for receiving the connector end of an umbilical cord and supplying electrical connection for receiving and supplying electrical power to said serial stop interlock circuit.

12. A web processing module as in claim 11 further comprising:

at least one dummy electrical connector for connection with an input connector which is not connected to an umbilical cord, said dummy electrical connector being wired to provide continuity in said serial stop interlock circuit.

13. A web processing line comprising:

a plurality of web processing modules which are interconnected by slack loop(s) of web material being processed;

each said module including a driven process station and at least one web driving station and each module being physically movable as a unit with respect to other module(s);

said driven process stations all being electrically coupled together to simultaneously maintain a coordinated synchronous drive to the process station of each module;

the web driving station within each module being electrically coupled to the driven process station of that same module to effect driven web motion as an electronically programmable function of the driven process motion for that particular module, with substantially equal average web throughput being maintained for all modules.

14. A web processing line as in claim 13 wherein each module includes casters on which it is conveniently movable over a horizontal surface.

15. A web processing line as in claim 13 wherein at least one of said modules includes a process which only periodically comes into physical contact with the web at a predetermined velocity and wherein the web driving station of said one module drives the web at a velocity matching the process velocity during such physical contact but at other times drives the web at different velocities so as to effect different web lengths between successive process contact times and thus produce a plurality of successive different form depths.

16. A web process line as in claim 13 wherein one of said modules operates as a master module controlling the process drive in all other modules.

17. A web process line as in claim 13 wherein:

an electrical control bus provides said electrical coupling between the driven process stations of each module, each process station being connected to monitor electrical control signals on said bus and to drive its respective process at a rate corresponding to the rates of the other modules;

each of said process stations also including means for transmitting said electrical control signals onto said bus, and arbitration means for insuring that only one of said process stations so transmits at any given time.

18. A web process line as in claim 17 wherein each module includes a control panel with operator switches for controlling its process drive and, via said bus, the process drive of all other modules.

19. A web process line as in claim 18 wherein said arbitration means includes means for, causing the module used to initiate process drive for the line to automatically become a master module which transmits said electrical control signals onto the bus.

20. A web process line in as in claim 19 wherein the control panel of any module, whether or not it happens to then be the master module, may be used by an operator to control the process drive of all modules.

21. A web process line as in claim 17 wherein at least one of said modules includes means for causing its particular process to run at a fixed multiple of the drive rate indicated by the electrical control signals on said bus.

22. A web process line as in claim 13 wherein:

each module includes programming means for selecting said programmable function; and each module includes data communication means which may be selectively activated to effect data communication linkage with all other modules so as to monitor programming changes effected by the programming means of any other module.

23. A web process line as in claim 13 wherein said electrical coupling includes a plug and socket connected electrical control bus having plural input sockets and at least one output line and plug associated with each module.

24. A web process line as in claim 23 further comprising:

a series stop circuit effected through inter-module connections of said bus and effective to stop the process drive of all modules if the stop circuit continuity is broken at any module.

25. A web process line as in claim 23 wherein said electrical coupling may be effected by an arbitrary interconnection of bus line plugs and sockets.

26. A web processing method comprising:

effecting a predetermined web process;

transporting a web with respect to said process, and controlling the driven web motion in accordance with an electrically programmable function of the process in predetermined sequences including sequences between successive process operations to enable alteration of the distances between successive processing operations.

27. A web processing method as in claim 26 wherein said web process is periodically in physical contact with said web at a predetermined velocity and wherein said web is driven at a velocity matching that of the process during the times of physical contact therewith.

28. A web processing method as in claim 26 and further comprising the step of effecting a plurality of different web lengths between seccessive process contact times and thus producing a plurality of successive different form lengths.

29. A web processing method including simultaneous practice of the method of claim 26 in each of a plurality of modules electrically interconnected and physically arrayed together to effect a coordinated web finishing process, each module effecting a different process but having substantially the same average web throughput, there being a slack loop of web disposed between adjacent modules in the array.

30. A web processing method comprising:

repetitively effecting a predetermined web process;

transporting a web with respect to said web processing means;

controlling the driven web motion in accordance with prestored velocity/position profile digital data representing a predetermined but programmable functional relationship between process motion and web motion to enable alteration in the distances between successive processing operations.

31. A web processing method as in claim 30 wherein said transporting step comprises:

producing a first electrical pulse $P_1$ in response to a predetermined first increment 1/N of process drive motion and at least one marker reference pulse $P_m$ occurring at a predetermined phase of each repetition of said web process;

producing a second electrical pulse $P_2$ in response to a predetermined second increment 1/M of driven web motion;

storing said profile digital data as a sequence of digital signal values corresponding to the programmed number of the web drive encoder pulses $P_2$ which are to occur for each succesive occurrence process drive encoder pulse $P_1$;

using said marker reference pulse $P_m$ as a web drive registration reference signal, using said web drive pulses $P_2$ as a feedback servo control signal and utilizing succesive ones of said profile data to derive a corrected and programmably controlled web drive output signal.

32. A web processing method as in claim 31 wherein a plurality of sets of said profile digital data is also pre-stored in compressed form using digital data signals representing: (a) form length, (b) length of required process/web speed matching, (c) overall process repeat length, and (d) one-half of a symmetrical web drive speed change.

33. A web processing method comprising:

providing an electrical intermodule umbilical bus adapted to electrically interconnect web processing modules;

driving a web with a web driving electrical motor and producing first output electrical signals representing increments of actual web motion;

driving a repetitive web process with a process driving electrical motor, producing second output electrical signals representing increments of actual process motion and also producing at least one marker reference signal occurring at a predetermined phase of each repetition of said web process;

using said first output electrical signals as a motion feedback signal in a web drive servo control loop and using said marker reference signal as a motion index reference signal for effecting registration control between said process driving and said web driving motors;

using said second output electrical signals in conjunction with profile data in said web drive servo loop to achieve overall programmable control of a predetermined functional relationship between said process driving and said web driving motors; and using said second output electrical signals in a main process drive servo loop as a motion feedback signal and using reference process drive signals obtained from said intermodule bus for maintaining the motion of said process driving motor in synchronism with said reference process drive signals.

34. A web processing method using plural free-standing modules, said method comprising:

providing an intermodule electrical bus adapted for electrical connection between modules;

using a process drive servo control loop electrically connected with said bus to drive a web process in synchronism with electrical process drive control signals appearing on said bus; and using a web drive servo control loop electrically connected with said process drive servo control loop to drive a web in synchronism and in a predetermined relationship with respect to said driven web process.

35. A web processing method as in claim 34 further comprising:

initiating process drive motion by operator actuation of a motion control switch on one of the modules; and supplying said process drive control signals to said bus from said one module when process drive motion is initiated by the operator of that one module.

36. A web processing method comprising:

interconnecting a plurality of web processing modules with slack loop(s) of web material being processed;

each said module including a driven process station and at least one web driving station and each module being physically movable as a unit with respect to other module(s);

electrically coupling all said driven process stations together and simultaneously maintaining a coordinated synchronous drive to the process station of each module;

electrically coupling the web driving station within each module to the driven process station of that same module and effecting driven web motion as an electronically programmable function of the driven process motion for that particular module, with substantially equal average web throughput being maintained for all modules.

37. A web processing method as in claim 36 wherein each module is conveniently movable on casters over a horizontal surface during said interconnecting step.

38. A web processing method as in claim 36 wherein at least one of said modules includes a process which only periodically comes into physical contact with the web at a predetermined velocity and wherein the web driving station of that module drives the web at a velocity matching the process velocity during such physical contact but at other times drives the web at different velocities so as to effect different web intervals between successive process contact times and thus produce a plurality of successive different form depths.

39. A web processing method as in claim 36 wherein one of said modules operates as a master module controlling the process drive in all other modules.

40. A web processing method as in claim 36 wherein:

an electrical control bus provides said electrical coupling between the driven process stations of each module, each process station being connected to monitor electrical control signals on said bus and to drive its respective process at a corresponding rate;

a selected one of said process stations also transmitting said electrical control signals onto said bus.

41. A web processing method as in claim 40 wherein the process drive of each module is controlled, via said bus, by operator manipulation of a control panel at any one of the modules.

42. A web processing method as in claim 41 wherein the module used to initiate process drive for the line automatically is selected to become master module which transmits said electrical control signals onto the bus.

43. A web processing method as in claim 40 wherein the process drive of at least one of said modules is run at a fixed multiple of the drive rate indicated by the electrical control signals on said bus.

44. A web processing method as in claim 36 wherein:

said programmable function is selectable at any module site; and data communication linkage is selectively activatable with all other modules so as to monitor programming changes effected at any other module.

45. A web processing method as in claim 36 wherein said electrical coupling is effected by a plug and socket connected electrical control bus having plural input sockets and at least one output line and plug having associated with each module.

46. A web processing method as in claim 45 further comprising:

arranging a series stop circuit through inter-module connections of said bus and making it effective to stop the process drive of all modules if the stop circuit continuity is broken at any module.

47. A web processing method as in claim 45 wherein said electrical coupling is effected by an arbitrary interconnection of bus line plugs and sockets.

* * * * *